United States Patent
Yamamoto et al.

(10) Patent No.: US 10,199,967 B2
(45) Date of Patent: Feb. 5, 2019

(54) MOTOR CONTROLLER, MOTOR DRIVING APPARATUS, MOTOR DRIVING SYSTEM, IMAGE FORMING APPARATUS, AND CONVEYING DEVICE

(71) Applicants: Norihiro Yamamoto, Kanagawa (JP); Haruyuki Suzuki, Kanagawa (JP); Masayuki Muranaka, Fukushima (JP)

(72) Inventors: Norihiro Yamamoto, Kanagawa (JP); Haruyuki Suzuki, Kanagawa (JP); Masayuki Muranaka, Fukushima (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/642,403

(22) Filed: Jul. 6, 2017

(65) Prior Publication Data
US 2018/0013363 A1    Jan. 11, 2018

(30) Foreign Application Priority Data
Jul. 8, 2016  (JP) ................................. 2016-136398

(51) Int. Cl.
| | |
|---|---|
| G05B 11/18 | (2006.01) |
| H02P 8/02 | (2006.01) |
| H02P 21/22 | (2016.01) |
| B65H 5/06 | (2006.01) |
| G05B 1/01 | (2006.01) |
| H02P 6/18 | (2016.01) |

(52) U.S. Cl.
CPC ............... *H02P 8/02* (2013.01); *B65H 5/062* (2013.01); *G05B 1/01* (2013.01); *H02P 6/18* (2013.01); *H02P 21/22* (2016.02); *G05B 2219/42095* (2013.01)

(58) Field of Classification Search
CPC .......... H02P 21/22; H02P 6/28; G05B 19/40; G05B 6/21
See application file for complete search history.

(56) References Cited

U.S. PATENT DOCUMENTS

| | | |
|---|---|---|
| 2007/0247092 A1 | 10/2007 | Komatsu et al. |
| 2011/0266990 A1 | 11/2011 | Murata et al. |
| 2013/0193894 A1 | 8/2013 | Kiguchi et al. |
| 2013/0257341 A1 | 10/2013 | Suzuki et al. |
| 2014/0049199 A1 | 2/2014 | Ishizuka et al. |
| 2014/0152212 A1* | 6/2014 | Zhang ....................... H02P 1/46 318/400.11 |
| 2014/0210545 A1* | 7/2014 | Leibowitz .............. G11C 5/147 327/540 |
| 2014/0361715 A1 | 12/2014 | Murata |

(Continued)

FOREIGN PATENT DOCUMENTS

| | | |
|---|---|---|
| JP | 2007-252178 | 9/2007 |
| JP | 2010-029016 | 2/2010 |

*Primary Examiner* — Karen Masih
(74) *Attorney, Agent, or Firm* — Harness, Dickey & Pierce, P.L.C.

(57) ABSTRACT

A motor controller that controls a motor in a first control method based on a first current command value and a second control method based on a second current command value. The motor controller includes an analog-to-digital converter to generate the second current command value based on a reference signal externally input to the motor controller and a current limit generator to generate an upper limit value of the first current command value based on the second current command value.

16 Claims, 13 Drawing Sheets

(56) References Cited

U.S. PATENT DOCUMENTS

| | | |
|---|---|---|
| 2015/0130385 A1 | 5/2015 | Ishizuka et al. |
| 2015/0270759 A1* | 9/2015 | Feliu .................... H02P 5/74 |
| | | 318/400.41 |
| 2015/0365032 A1* | 12/2015 | Katsumata ........... H02P 21/141 |
| | | 318/802 |
| 2016/0056743 A1 | 2/2016 | Suzuki et al. |
| 2016/0065109 A1 | 3/2016 | Yamamoto et al. |
| 2016/0164443 A1 | 6/2016 | Murata |
| 2016/0248360 A1 | 8/2016 | Seki |
| 2016/0274152 A1 | 9/2016 | Seki |
| 2017/0090386 A1 | 3/2017 | Takahashi et al. |

* cited by examiner

MOTOR CONTROLLER, MOTOR DRIVING APPARATUS, MOTOR DRIVING SYSTEM, IMAGE FORMING APPARATUS, AND CONVEYING DEVICE

CROSS-REFERENCE TO RELATED APPLICATION

This patent application is based on and claims priority pursuant to 35 U.S.C. § 119(A) to Japanese Patent Application No. 2016-136398, filed on Jul. 8, 2016 in the Japan Patent Office, the entire disclosure of which is hereby incorporated by reference herein.

BACKGROUND

Technical Field

Embodiments of the present disclosure relate to a motor controller, a motor driving apparatus, a motor driving system, an image forming apparatus, and a conveying device.

Related Art

Open-loop control and closed-loop control are known as methods of controlling a motor without using a sensor. The open-loop control controls the motor based on a given logic without feeding back a controlled result, such as a speed of the motor, a position of the motor, etc., hereinafter simply referred to as a location. With open-loop control, the motor can be driven in a simple way. By contrast, the closed-loop control uses the position of the motor to match the position of the motor to a prescribed control value.

A method of controlling the motor by switching between the open-loop control and the closed-loop control is also known. To perform such a method, a motor control IC (an Integrated Circuit) capable of controlling the motor by switching between these methods is utilized. A current value employed in the open-loop control and a limit current value employed in the closed-loop control are externally set and input to the motor control IC. These two current values are generally input and set from two different input pins included in the motor control IC.

SUMMARY

One aspect of the present disclosure provides a novel motor controller that includes a first current command value generator to generate a first current command value, an analog-to-digital converter to generate a second current command value based on a reference signal externally input to the motor controller, and a current limit generator to generate an upper limit value of the first current command value based on the second current command value. The motor controller controls the motor in a first control method based on the first current command value and a second control method based on the second current command value.

Another aspect of the present disclosure provides a novel motor driving apparatus that includes the motor controller and an inverter to drive the motor in accordance with an output of the motor controller.

Yet another aspect of the present disclosure provides a novel motor driving system that includes the motor and the motor driving apparatus.

Yet another aspect of the present disclosure provides a novel image forming apparatus that includes a housing, and the motor driving system installed in the housing.

Yet another aspect of the present disclosure provides a novel conveying device that includes a conveyor to convey an object and the motor driving system connected to the conveyor.

Yet another aspect of the present disclosure provides a novel method of controlling a motor with a motor controller by using a first control method and a second control method. The method comprises generating a first current command value; receiving a reference signal externally input to the motor controller; and generating a second current command value with an analog-to-digital converter based on the reference signal. The method further comprises generating an upper limit value of the first current command value with a current limit generator based on the second current command value; and alternately implementing the first control method and the second control method based on the upper limit value of the first current command value and the second current command value, respectively.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
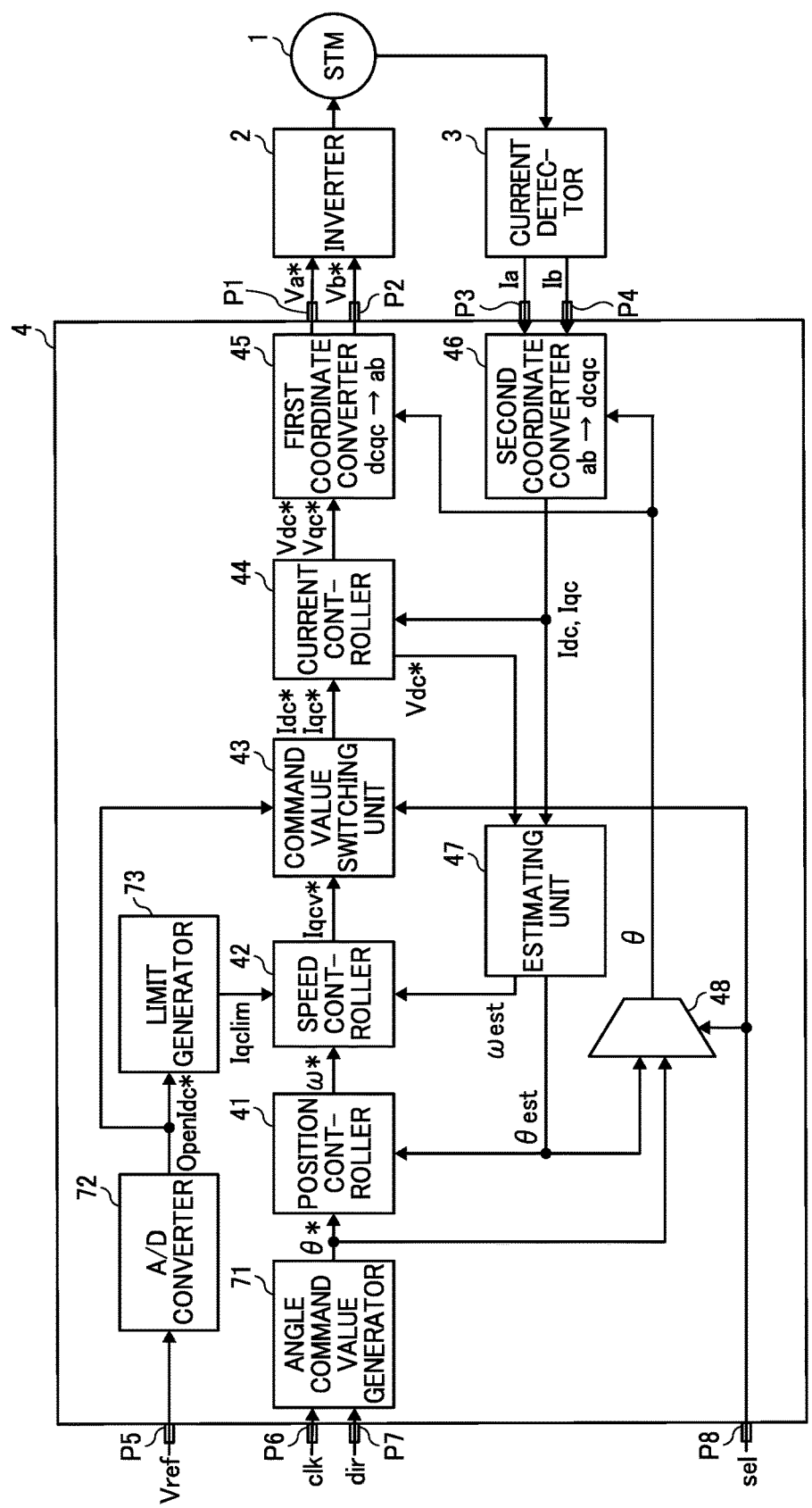
FIG. 1 is a diagram schematically illustrating one example of a motor driving system according to a first embodiment of the present disclosure.

Referring now to the drawings, wherein like reference numerals designate identical or corresponding parts throughout the several views thereof, a motor driving system according to the first embodiment of the present disclosure is described with reference to FIGS. 1 to 11. The motor driving system according to this embodiment of the present disclosure is a system, in which the motor driving unit controls a motor by executing so-called sensorless control. Further, the motor is controlled by using two different control methods, open-loop control and closed-loop control. Each of the control methods is described later more in detail.

FIG. 1 illustrates one example of a motor driving system according to the first embodiment of the present disclosure. The motor driving system of FIG. 1 includes a motor 1, an inverter 2, a current detector 3, and a motor controller 4. The inverter 2, the current detector 3, and the motor controller 4 collectively constitute the motor driving system that drives the motor 1.

The motor 1 is a two-phase stepping motor (STM). These two phases of the motor 1 are hereinafter referred to as A and B phases, respectively. The motor 1 includes multiple coils of the phase A and the phase B (i.e., stators) and a rotor. The rotor is composed of multiple permanent magnets of S and N poles arranged alternately, thereby constituting p pairs of poles (i.e., pairs of S pole and N pole).

An angle of the rotor that rotates once per one cycle is hereinafter referred to as a mechanical angle. An angle of the rotor that rotates once per p cycles is hereinafter referred to as an electrical angle. Thus, the electric angle is p times of the mechanical angle. Hereinafter, unless otherwise specifically noted, each of the angle (i.e., a position) and a speed (i.e., an angle speed) of the rotor is represented by the electrical angle.

The motor 1 is driven by an electric current supplied from the inverter 2. More specifically, in the motor 1, currents IA and IB are supplied from the inverter 2 to the multiple coils of the phase A and the phase B, respectively. The rotor of the motor 1 rotates by following a magnetic field generated by the multiple coils of the phase A and the phase B in accordance with the currents IA and IB.

The inverter 2 supplies the currents IA and IB to the motor 1 and drives the motor 1 in accordance with voltage command values Va* and Vb* output by the motor controller 4. Hereinafter, a value with an asterisk * indicates a command value (i.e., a controlling value). The voltage command values Va* and Vb* are command values of voltages to be applied to the coils of the phase A and the phase B, respectively.

Figure 2:
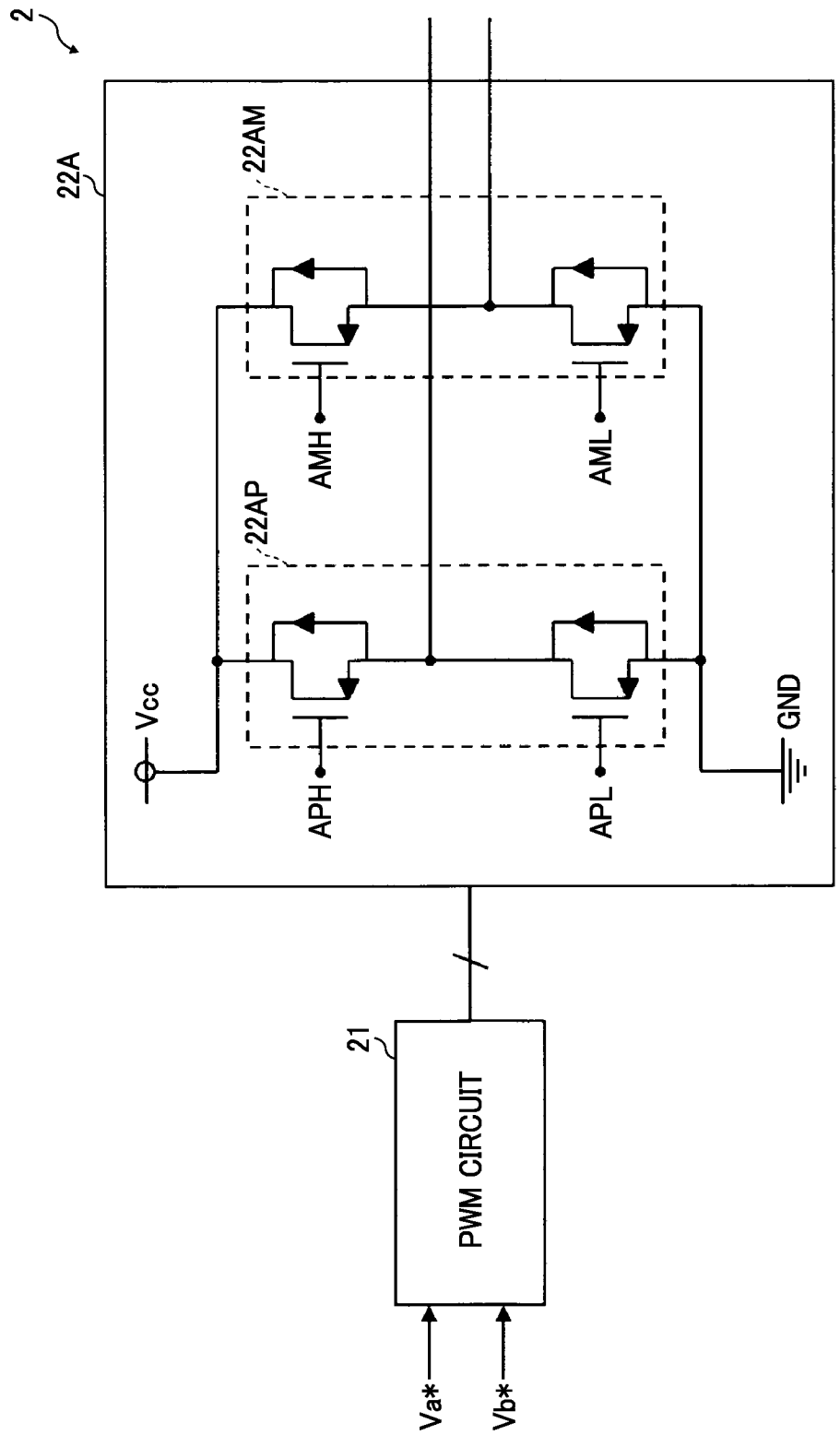
FIG. 2 is a diagram schematically illustrating one example of an inverter included in the motor driving system according to the first embodiment of the present disclosure.

FIG. 2 illustrates one example of the inverter 2. The inverter 2 of FIG. 2 includes a PWM (Pulse Width Modulation) circuit 21 and a driving circuit 22.

The PWM circuit 21 generates and outputs a control signal for the A-phase (e.g., APH, APL, AMH, and AML) by applying pulse-width modulation to the voltage command value Va*. The PWM circuit 21 also generates and outputs a control signal for the B-phase (e.g., BPH, BPL, BMH, and BML) by applying pulse-width modulation to the voltage command value Vb* as well. In an example of FIG. 2, the control signal is a pulse signal composed of High and Low levels. The control signal output from the PWM circuit 21 is input a driving circuit 22A.

The driving circuit 22 includes a driving circuit 22A for the A phase and a driving circuit 22B for the B phase. The driving circuit 22A includes a driving circuit 22AP that applies a voltage to one end of the coil of the A phase and a driving circuit 22AM that applies a voltage to the other end of the coil of the A phase. Each of these driving circuits 22AP and 22AM is composed of a switching element connected between a power supply (Vcc) and an output terminal, another switching element connected between the output terminal and a ground wire (GND), and a diode connected in parallel to each of the switching elements. In an example of FIG. 2, the switching element is a MOSFET (Metal Oxide Semiconductor Field Effect Transistor). However, the switching element is not limited to the same and can be a bipolar transistor as well.

The output terminal of the driving circuit 22AP is connected to one end of the coil of the A phase. The switching elements of the driving circuit 22AP respectively receive control signals of the A phase (APH, APL) output from the PWM circuit 21. An output terminal of the driving circuit 22AM is connected to the other end of the coil of the A phase as well. The switching elements of the driving circuit 22AP also receive A phase control signals (AMH, AML) output from the PWM circuit 21. Hence, when each of the switching elements is turned on and off in accordance with the control signal input thereto, the current IA is supplied to the coil of the A phase in accordance with the voltage command value Va*.

Because a configuration of the driving circuit 22B is same as that of the driving circuit 22A, description thereof is herein below omitted. Here, the inverter 2 is not limited to the configuration illustrated in FIG. 2. That is, the PWM circuit 21 can be included in the motor controller 4 as well, for example. As the inverter, any circuit capable of supplying the currents IA and IB in accordance with the voltage command values Va* and Vb*, respectively can be utilized.

The current detector 3 detects and outputs current values Ia and Ib of the currents IA and IB, respectively, supplied to the motor 1. The current values Ia and Ib output by the current detector 3 are input to the motor controller 4.

Figure 3:
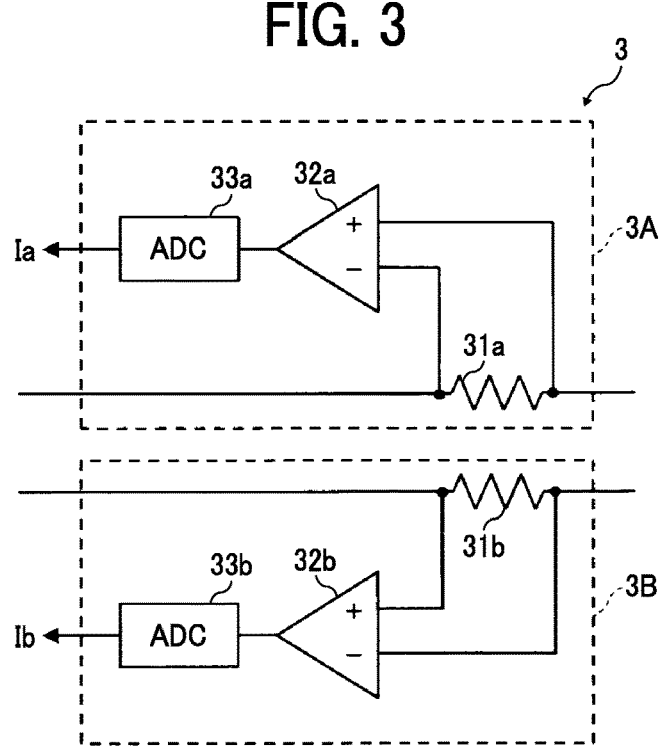
FIG. 3 is a diagram schematically illustrating one example of a current detector included in the motor driving system according to the first embodiment of the present disclosure.

FIG. 3 illustrates one example of the current detector 3. The current detector 3 of FIG. 3 includes a current detector 3A for the A phase and a current detector 3B for the B phase. The current detector 3A includes a shunt resistor 31a, a differential amplifier 32a, and an A/D converter 33a.

The shunt resistor 31a is connected between an output terminal of the driving circuit 22A and the coil of the A phase. Hence, when the driving circuit 22a supplies the coil with the current IA, the current IA flows through the shunt resistor 31a, and accordingly a voltage drops therein in accordance with the resistance of the shunt resistor 31a.

A pair of differential input terminals of a differential amplifier 32a is connected to both ends of the shunt resistor 31a, respectively. Hence, the differential amplifier 32a amplifies the voltage dropped in the shunt resistor 31a (i.e., a difference in potential between the terminals of the shunt resistor 31a) on a prescribed gain and outputs an amplified voltage obtained in this way.

An A/D converter 33a applies A/D (Analog to Digital) conversion to the output signal of the differential amplifier 32a and outputs a digital value obtained in this way. The digital value is then input to the motor controller 4 as the current value Ia.

Since a configuration of the current detector B is similar to that of the current detector 3A, description of the configuration of the current detector B is herein below omitted. The current detector 3 is not limited to a configuration illustrated in FIG. 3. That is, as the current detector 3, any circuit capable of detecting the current values Ia and Ib can be used as well.

The motor controller 4 includes a processor and a memory. For example, as the processor, a CPU (Central Processing Unit), a MPU (Micro Processing Unit), a DSP (Digital Signal Processor), an ASIC (Application Specific Integrated Circuit), a FPGA (Field Programmable Gate Array), and a PLD (Programmable Logic Device) or the like can be used upon need. The processor runs program stored in the memory.

As the memory, a DRAM (Dynamic Random Access Memory), a SRAM (Static RAM), a MRAM (Magnetic RAM), and a Flash memory or the like can be used. The memory stores program run by the processor.

The motor controller 4 may optionally include one or more processors and one or more memories as well. The motor controller 4 is configured by a motor control IC as a motor control IC chip. The motor control IC can include at least one of the inverter 2 and the current detector 3. The motor control IC may be one of a digital IC, an analog IC, and a combination of these ICs as well.

The motor controller 4 includes multiple pins P1 to P8. A pin P1 is an output pin to output the voltage command value Va*. A pin P2 is also an output pin to output the voltage command value Vb*. A pin P3 is an input pin to receive the current value Ia. A pin P4 is also an input pin again to receive the current value Ib. A pin P5 is an input pin to receive the reference signal Vref. A pin P6 is again an input pin to receive the clock clk. A pin P7 is also an input pin to receive a direction indicating signal dir. A pin P8 is again an input pin to receive the selecting signal sel. The motor controller 4 may include additional input and output pins other than the above-described input and output pins. Various signals input and output to and from each of the pins P1 to P8 are described later more in detail.

The motor controller 4 controls the motor 1 by executing two control methods of the closed-loop control (a first control method) and the open-loop control (a second control method).

The closed-loop control is a control method of controlling the motor 1 by feeding back an angle and a speed of the motor 1. That is, in the closed-loop control, the angle and the speed of the motor 1 as control results are fed back. Then, the motor 1 is controlled to match the fed back angle and speed with the command values of an angle and a speed.

As in this embodiment of the present disclosure, when the motor 1 is controlled without a sensor, angle and speed of the motor 1 cannot be directly obtained. Accordingly, in this embodiment of the present disclosure, estimated values of the angle and the speed of the motor 1 are fed back to enable closed-loop control, by which the motor 1 can be highly-precisely controlled.

Herein below, an exemplary motor controller 4 that controls the motor 1 by feeding back both the angle and the speed of the motor 1 is described. However, the motor controller 4 can also control the motor 1 by feeding back only one of the angle and the speed thereof.

The open-loop control method controls the motor 1 based on a preset current command value. Unlike the closed-loop control, an angle and a speed of the motor 1 as control results are not fed back in the open-loop control. Hence, according to the open-loop control, the motor 1 can be readily controlled by a simplified manner.

As illustrated in FIG. 1, the motor controller 4 includes, as functional elements, a position controller 41, a speed controller 42, and a command value switching unit 43. The motor controller 4 also includes a current controller 44, a first coordinate converter 45, and a second coordinate converter 46. The motor controller 4 further includes an estimating unit 47, a selector 48, and an angle command value generator 71. The motor controller 4 further includes an A/D converter 72, and a current limit generator 73 as well. These functional elements are realized by the processor when it runs program stored in the memory.

The position controller 41 calculates an angle error θerr based on an angle command value θ* and an angle estimated value θest. The angle command value θ* represents an angle (i.e., a position) of the rotor, and is input from an angle command value generator 71. However, the angle command value θ* can be externally input to the motor controller 4 (for example, from a top application). The angle estimated value θest is an estimated value of an angle of the rotor and is input from the estimating unit 47. An angle error θerr is a difference between the angle command value θ* and the angle estimated value θest.

The position controller 41 executes either proportional control (P control) or proportional integral control (PI control) and outputs a speed command value ω* to render the angle error θerr to follow 0 (zero). The speed command value ω* represents a command value of a speed (i.e., an angle speed) of the rotor. The speed command value ω* output by the position controller 41 is input to the speed controller 42.

The speed controller 42 calculates a speed error ωerr based on the speed command value ω* and a speed estimated value ωest. The speed estimated value ωest is an estimate value of a speed of the rotor, and is input from the estimating unit 47. The speed error ωerr is a difference between the speed command values ω* and the speed estimated value ωest.

The speed controller 42 outputs a current command value Iqcv* to render the speed error ωerr to follow 0 (zero) and below a current limit value Iqclim by executing either the P control or the PI control again. The current command value Iqcv* is a command value of a qc axial current to be supplied to the motor 1 when the closed-loop control is conducted. The current limit value Iqclim is the maximum value of the current command value Iqc* and is set to protect the motor driving system when the closed-loop control is conducted. The current limit value Iqclim is input from a current limit generator 73. The current command value Iqcv* output from the speed controller 42 is then input to a command value switching unit 43.

More specifically, when a current value of a qc-axis current calculated to enable the speed error ωerr to follow 0 (zero) is below the current limit value Iqclim, the speed controller 42 outputs the current value obtained by calculating in this way as a current command value iqcv*. By contrast, when a current value of the qc-axis current calculated to enable the speed error ωerr to follow 0 (zero) exceeds the current limit value Iqclim, the speed controller 42 outputs the current limit value Iqclim as the current command value iqcv*.

Figure 4:
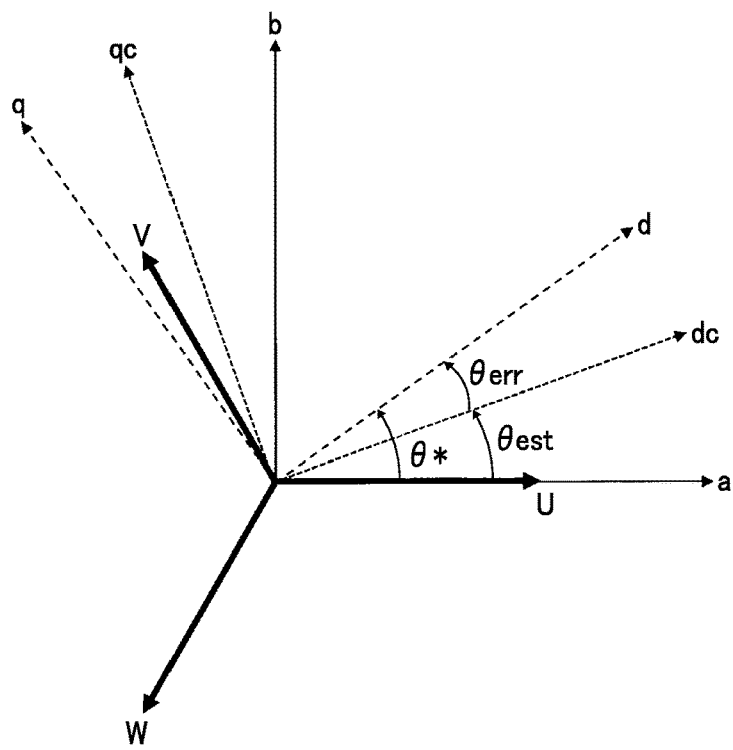
FIG. 4 is a diagram schematically illustrating coordinate systems used in controlling a motor according to the first embodiment of the present disclosure.

Now, coordinate systems used in controlling the motor 1 are described with reference to FIG. 4. FIG. 4 is a diagram schematically illustrating exemplary coordinate systems used in controlling the motor 1. As illustrated in FIG. 4, a solid line indicates an ab-coordinate system, a dashed line indicates a dq-coordinate system, a dotted line indicates a dcqc-coordinate system, and a thick line indicates a UVW-coordinate as well. Each of the coordinate systems shares the common origin as illustrated.

The ab-coordinate system is a fixed coordinate system composed of an a-axis and a b-axis perpendicular to each other. The a-axis corresponds to the A phase of the motor 1. The b-axis corresponds to the B-phase of the motor 1 as well. Specifically, a current value Ia of a current IA supplied to the coil of the A phase is an a-axis component of a current supplied to the motor 1. Similarly, a current value Ib of a current IB supplied to the coil of the B phase is a b-axis component of the current supplied to the motor 1.

The dq-coordinate system is a rotating coordinate system composed of a d-axis and a q-axis perpendicular to each other. An angle formed by the d axis with the a-axis corresponds to the angle command value θ*. Specifically, the dq coordinate system is a coordinate system established based on an ideal position of the rotor.

A dcqc coordinate system is a rotating coordinate system composed of a dc-axis and a qc-axis perpendicular to each other. An angle formed by the dc-axis with the a-axis corresponds to the angle estimated value θest. An angle formed by the d-axis with the dc-axis corresponds to an angle error θerr as well. That is, the dcqc coordinate system is a coordinate system established based on a position of the rotor estimated by the motor controller 4. In the closed-loop control, a current is supplied to the motor 1 to render the angle error θerr to follow 0 (zero). Hence, the above-described qc-axis current represents a qc axis component of the current supplied to the motor 1.

A UVX coordinate system is a fixed coordinate system composed of U, V, and W coordinate axes each having a different phase from the other by 120 degrees. These U, V, and W axes correspond to U, V, and W phases of a three-phase motor. It is premised herein below that the U-axis and the a-axis coincide as illustrated in FIG. 4. The UVW coordinate system is utilized in the below described embodiment of the present disclosure.

The command value switching unit 43 switches between current command values Idc* and Iqc* depending on a selecting signal sel. The selecting signal sel is a signal to specify one of the open-loop control and the closed-loop control. In this embodiment of the present disclosure, the selecting signal sel is input from the outside of the motor controller 4 via the pin P8.

A current command value Idc* (i.e., a first current command value) is a command value of a DC axis current acting as a dc axis component of the current supplied to the motor 1. A current command value Iqc* (i.e., a second current command value) is a command value of a qc axis current acting as a qc axis component of the current supplied to the motor 1. These current command values Idc* and the Iqc* output from the command value switching unit 43 are input to the current controller 44.

While the selecting signal sel specifies the closed-loop control, the command value switching unit 43 outputs 0 (Idc*=0) as the current command value Idc*, and outputs a current command values Iqcv* (Iqc*=Iqcv*) as the current command value Iqc*. Specifically, the current command value to control the motor 1 in the closed-loop control is the current command value Iqcv*.

When the selecting signal sel designates the open-loop control other than a switching period, the command value switching unit 43 outputs a current command value OpenIdc* (a first target value) as the current command value Idc* (i.e., Idc*=OpenIdc*) and 0 (i.e., a second target) as the current command value Iqc* (Iqc*=0). The current command value OpenIdc* is a command value of the dc axis current to be supplied to the motor 1 when the open-loop control is conducted, and is input from an AD (analog to digital) converter 72. Specifically, a current command value to control the motor 1 when the open-loop control is executed other than the switching period is the current command value OpenIdc*.

The switching period is a period of time elapsed from when the control method designated by the selecting signal sel is switched. During the switching period, the command value switching unit 43 causes the current command values Idc* and Iqc* used in a control method before the switching period (i.e., the closed-loop control) gradually transition to target values of the current command values Idc* and Iqc* to be used after the switching period in a different control method (e.g., the open-loop control).

Specifically, when the control method is switched from the closed-loop control to the open-loop control, the command value switching unit 43 causes the current command value idc* to transition from the value 0 to the value OpenIdc* step by step during the switching period. That is, the value OpenIdc* corresponds to the target value of the current command value Idc* when the control method is switched. In addition, the command value switching unit 43 causes the current command value Iqc* to transition from the value Iqcv* to the value 0 step by step during the switching period as well. Specifically, the value 0 corresponds to a target value of the current command value iqc* when the control method is switched. Here, the target value of the current command value iqc* (a second target value) may be a microscopic value smaller enough than the value OpenIdc*. At this moment, the command value switching unit 43 outputs the current command values Idc* and Iqc* with an amplitude of a current supplied to the motor 1 during the switching period equalized with an amplitude of a current supplied to the motor 1 after the switching period.

The amplitude of the current supplied to the motor 1 is calculated as $(Idc^{*2}+Iqc^{*2})^{1/2}$, and the amplitude of the current supplied to the motor 1 after the switching period becomes the value OpenIdc*. Hence, the command value switching unit 43 outputs the current command values Idc* and Iqc* to render the amplitude of the current supplied to the motor 1 to be the value OpenIdc* during the switching period.

In this way, since the command value switching unit 43 renders the current command values Idc* and Iqc* to transition step by step, the current command values Idc* and Iqc* used in the control method before the switching period can be effectively switched to the current command values Idc* and Iqc* used in the other control method after the switching period. The command value switching unit 43 is described later more in detail.

The current controller 44 calculates a current error Idcerr based on the current command value Idc* and a current value Idc. The current error Idcerr is a difference between the current command value Idc* and the current value Idc. The current value Idc is input from the second coordinate converter 46.

The current controller 44 similarly calculates a current error Iqcerr based on the current command value Iqc* and a current value Iqc. The current error Iqcerr is a difference between the current command value Iqc* and the current value Iqc. The current value Iqc is input from the second coordinate converter 46 again.

The current controller 44 outputs the voltage command values Vdc* and Vqc* to render the current errors Idcerr and Iqcerr (each) to follow 0 by executing one of P (Proportion) and PI (Proportion and Integration) controls. The voltage command value Vdc* is a command value of the dc axis voltage that is a dc axis component of a voltage applied to the motor 1. The voltage command value Vqc* is a command value of the qc axis voltage that is a qc axial component of the voltage applied to the motor 1. The voltage command values Vdc* and Vqc* output from the current controller 44 are input to the first coordinate converter 45. The voltage command value Vdc* output by the current controller 44 is also input to the estimating unit 47.

The first coordinate converter 45 applies coordinate conversion to the voltage command values Vdc* and Vqc* to generate voltage command values Va* and Vb* by converting from the coordinate system dcqc to the coordinate system ab. The first coordinate converter 45 then outputs the voltage command values Va* and Vb* through the pins P1 and P2, respectively. The voltage command values Va* and Vb* output from the first coordinate converter 45 is then input to the inverter 2. The voltage command values Va* and Vb* are represented by the following formula.

$$\begin{bmatrix} Va^* \\ Vb^* \end{bmatrix} = \begin{bmatrix} \cos\theta & -\sin\theta \\ \sin\theta & \cos\theta \end{bmatrix} \begin{bmatrix} Vdc^* \\ Vqc^* \end{bmatrix} \quad \text{(Formula 1)}$$

As indicated, a first term on the right hand of the formula 1 is a conversion matrix for converting a coordinate. A reference character θ is an angle input from the selector 48. The angle θ is an angle command value θ* when the open-loop control is conducted and an angle estimated value θest when the closed-loop control is conducted.

The second coordinate converter 46 generates and outputs current values Idc and Iqc by converting the current values Ia and Ib input through respective pins P3 and P4 from the ab coordinate system to the dcqc coordinate system. The current values Idc and Iqc output by the second coordinate converter 46 are input to each of the current controller 44 and the estimating unit 47 as well. The current values Idc and Iqc are represented by the following formula.

$$\begin{bmatrix} Idc \\ Iqc \end{bmatrix} = \begin{bmatrix} \cos\theta & \sin\theta \\ -\sin\theta & \cos\theta \end{bmatrix} \begin{bmatrix} Ia \\ Ib \end{bmatrix} \quad \text{(Formula 2)}$$

As indicated, a first term of the right hand of the formula 2 is a conversion matrix for converting a coordinate. Again, a reference character θ is an angle input from the selector 48. The angle θ is an angle command value θ* when the open-loop control is conducted and an angle estimated value θest when the closed-loop control is conducted.

The estimating unit 47 estimates and outputs an angle and a speed of the rotor based on the voltage command value Vdc* and the current values Idc and Iqc as well. Specifically, the estimating unit 47 calculates and outputs an angle estimated value θest and a speed estimated value ωest. The speed estimated value ωest output by the estimating unit 47 is input to the speed controller 42. The angle estimated value θest output by the estimating unit 47 is input to the position controller 41 and the selector 48 as well. The estimating unit 47 can employ an existing estimating method to estimate the angle and the speed.

Herein below, an example in which the estimating unit 47 estimates the angle and the speed based on an induced voltage is described. Voltage formulas listed below are established in the motor 1.

$$\begin{bmatrix} Vdc^* \\ Vqc^* \end{bmatrix} = \begin{bmatrix} R + pLd & -\omega re \cdot Lp \\ \omega re \cdot Lq & pLd \end{bmatrix} \begin{bmatrix} Idc \\ Iqc \end{bmatrix} + \begin{bmatrix} edc \\ eqc \end{bmatrix} \quad \text{(Formula 3-1)}$$

$$\begin{bmatrix} edc \\ eqc \end{bmatrix} = Eex \begin{bmatrix} -\sin(\theta re - \theta est) \\ \cos(\theta re - \theta est) \end{bmatrix} + (\omega est - \omega re)Ld \begin{bmatrix} -Idc \\ -Iqc \end{bmatrix} \quad \text{(Formula 3-2)}$$

$$Eex = \omega re((Ld - Lq)Id + \psi a) - pIq(Ld - Lq) \quad \text{(Formula 3-3)}$$

In the formulas 3-1 to 3-3, a reference character R represents a winding resistance of a coil, a reference character p represents a differential operator, and a reference character Ld represents a d-axis inductance. Further, a reference character Lq represents a q-axis inductance, a reference character edc represents an induced dc axis voltage, and a reference character eqc represents an induced qc axis voltage. Further, a reference character Id represents a d-axis current, a reference character Iq represents a q-axis current, and a reference character ωre represents an actual speed (i.e., a speed of reality) of the rotor. A reference character θre represents an actual angle (i.e., an angle of reality) of the rotor. A reference character Ψa represents an armature (interlink) flux number.

Based on the formulas 3-1 to 3-3, the following formula is established.

$$edc = Vdc^* - R \cdot Idc - p(Ld \cdot Idc) + \omega re \cdot Lq \cdot Iqc \quad \text{(Formula 4)}$$

When the value ωest is nearly equal to the value ωre, the following formula is established based on the formulas 3-2 and 4.

$$-Eex \sin(\theta re - \theta est) = Vdc^* - R \cdot Idc - p(Ld \cdot Idc) + \omega re \cdot Lq \cdot Iqc \quad \text{(Formula 5)}$$

When it is premised that the rotor rotates at a constant speed, since the value Id is 0 and the value Iq is constant, the formula 5 can be rewritten as follows.

$$Eex = \omega re \cdot \psi a \quad \text{(Formula 6)}$$

When the value ID is 0 and the value Iq is constant, a value Idc also becomes constant. Accordingly, based on the formulas 5 and 6, the following formula can be established.

$$\sin(\theta re - \theta est) = (1/(-\omega re \cdot \psi a))(Vdc^* - R \cdot Idc + \omega re \cdot Lq \cdot Iqc) \quad \text{(Formula 7)}$$

In the closed-loop control, to match the actual angle θre with the angle command value θ*, the angle estimated value θest is controlled to match with the actual angle Ore. Hence, when the left hand of the Formula 7 is 0 (zero), the following formula can be established.

$$Vdc^* - R \cdot Idc + \omega re \cdot Lq \cdot Iqc = 0 \quad \text{(Formula 8)}$$

The estimating unit 47 outputs as an actual speed ωre that satisfies the formula 8 as the speed estimated value ωest. The estimating unit 47 can calculate the angle estimated value θest by integrating the speed estimated value ωest.

Here, in this embodiment of the present disclosure, the motor controller 4 can omit the estimating unit 47. In such a situation, a sensor such as a pulse encoder, etc., is disposed in the motor 1 to measure the actual angle θre and the actual speed ωre of the rotor. In addition, each of the functional elements may calculate the command value and execute the coordinate conversion by using the actual angle θre and the actual speed ωre instead of the angle estimated value θest* and the speed estimated value ωest.

The selector 48 receives the angle command value θ* and the angle estimation value θest, and selectively outputs one of the angle command value θ* and the angle estimated value θest in accordance with the selecting signal sel. In this embodiment of the present disclosure, the selecting signal sel is input from an outside of the motor controller 4 via the pin P8. Either the angle command value θ* or the angle estimated value θest output by the selector 48 is input to each of the first coordinate converter 45 and the second coordinate converter 46 as well.

The selector 48 selects and outputs the angle command value θ* when the open-loop control is designated by the selecting signal sel. By contrast, the selector 48 selects and outputs the angle command value θest when the closed-loop control is designated by the selecting signal sel.

The angle command value generator 71 generates and outputs the angle command value θ* based on a clock signal clk input to the motor controller 4 through a pin P6 and a direction indicating signal dir input to the motor controller 4 through a pin P7. The direction indicating signal dir is a signal to indicate a direction of rotation of the rotor. The angle command value θ* output by the angle command value generator 71 is input to each of the position controller 41 and the selector 48 as well.

In this embodiment of the present disclosure, the motor controller 4 can omit the angle command value generator 71. That is, in such a situation, the angle command value θ* can be externally input to the motor controller 4 via an input pin.

The A/D converter 72 is composed of an analog-digital converting device, and receives the reference signal Vref from an outside of the motor controller 4 via the input pin P5. The reference signal Vref is a voltage signal input to the motor controller 4 to generate the current command value OpenIdc*. For example, the reference signal Vref is generated and input to the motor controller 4 by dividing a prescribed voltage generated by a band-gap reference circuit and is input to the motor controller 4. Instead of the voltage signal, a current signal may be input to the motor controller 4 as the reference signal.

The A/D converter 72 applies A/D conversion to the reference signal Vref to obtain and output a digital value as the current command value OpenIdc*. That is, the A/D converter 72 generates the current command value OpenIdc* based on the reference signal Vref. The current command value OpenIdc* output by the A/D converter 72 is input to each of the command value switching unit 43 and the current limit generator 73 as well.

In this embodiment of the present disclosure, the motor controller 4 may include a proportional converting unit that proportionally converts the digital value output by the A/D converter 72 by multiplying the digital value by a given number and outputs a conversion result executed in this way as the current command value OpenIdc*.

The current limit generator 73 generates the current limit value Iqclim based on the current command value OpenIdc*. The current limit value Iqclim output by the current limit generator 73 is input to the speed controller 42.

Figure 5:
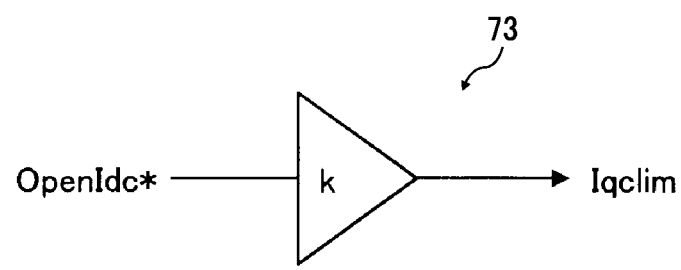
FIG. 5 is a diagram schematically illustrating one example of a current limit generator according to the first embodiment of the present disclosure.

FIG. 5 illustrates one example of the current limit generator 73. The current limit generator 73 of FIG. 5 is composed of a proportional operation device that multiplies an input value by a constant k and outputs a calculation result. Hence, the current limit generator 73 generates the current limit value Iqclim by multiplying the current command value OpenIdc* by k (Iqclim=k×OpenIdc*).

In general, since the current command value OpenIdc* and the current limit value Iqclim are determined by characteristics of the motor 1, the current command value OpenIdc* and the current limit value Iqclim are frequently proportional to each other. When the current command value OpenIdc* and the current limit value Iqclim are proportional to each other in this way, the current limit value Iqclim proportional to the current command value OpenIdc* can be easily generated by the current limit generator 73 illustrated in FIG. 5.

Figure 6:
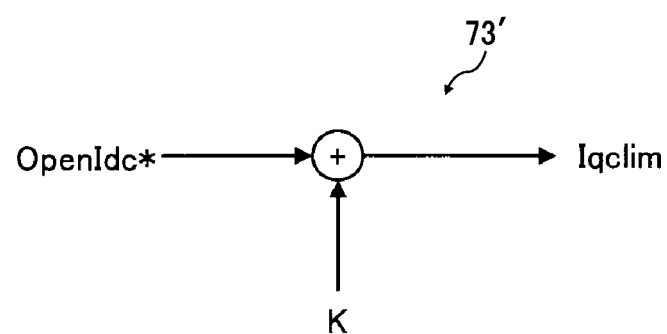
FIG. 6 is a diagram schematically illustrating another example of the current limit generator according to the first embodiment of the present disclosure.

FIG. 6 illustrates another exemplary current limit generator 73' as a modification of the first embodiment of the present disclosure. The current limit generator 73' of FIG. 6 includes an adder that adds a given value k to an input value and outputs such a calculated result. Hence, the Limit generator 73' generates the current limit value Iqclim (Iqclim=K+OpenIdc*) by adding the given value K to the current command value OpenIdc*. With the current limit generator 73' of FIG. 6, the current limit value Iqclim having a given margin of a prescribed current value from the current command value OpenIdc* can be easily set.

The method of generating the current limit value Iqclim is not limited to the above-described method. For example, the current limit generator 73 can generate the current limit value Iqclim by optionally combining the above-described multiplication and addition as well. Further, the current limit generator 73 may generate the current limit value Iqclim with reference to a table that lists a relation between the current limit value Iqclim and the current command value OpenIdc* as well. The table can be prepared in advance based on either experiments or simulations.

Figure 7:
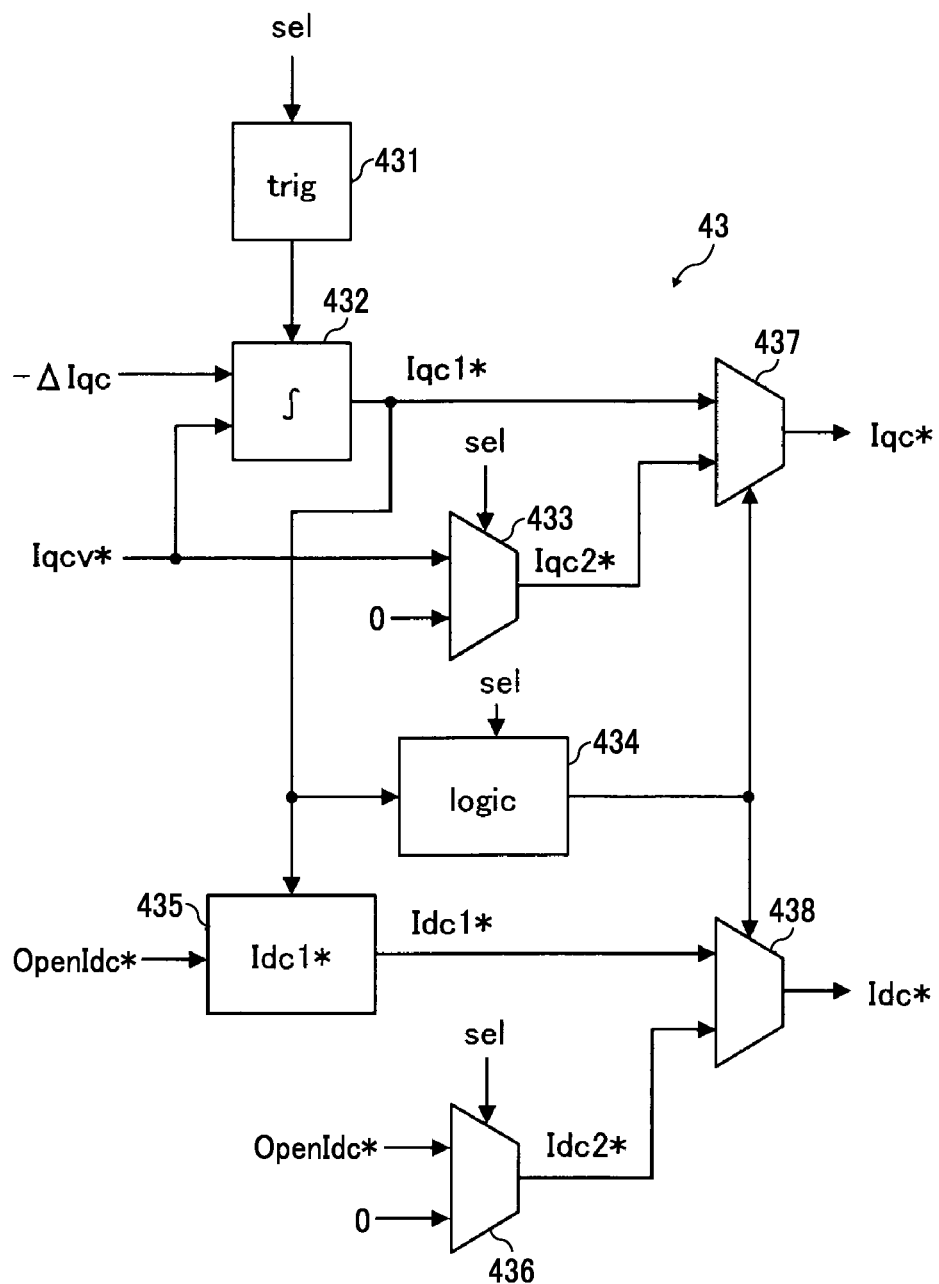
FIG. 7 is a diagram illustrating one example of a command value switching unit according to the first embodiment of the present disclosure.

FIG. 7 illustrates one example of the command value switching unit 43. The command value switching unit 43 of FIG. 7 includes a trigger generator 431 (trig), an integrator 432, and a first selector 433. The command value switching unit 43 also includes a switching period determiner 434, a current command value generator 435 (Idc1*), and a second selector 436. The command value switching unit 43 further includes a third selector 437 and a fourth selector 438.

The trigger generator 431 receives the selecting signal sel. The trigger generator 431 outputs a trigger signal when a control method specified by the selecting signal sel is switched from the closed-loop control to the open-loop control. An output timing of the trigger signal corresponds to a starting point of the switching period. The trigger signal output by the trigger generator 431 is input to integrator 432.

The integrator 432 receives the current command value Iqcv*, a current value −ΔIqc, and the trigger signal as well. Upon receiving the trigger signal, the integrator 432 starts integrating the current value −Δiqc while maintaining the current command value iqcv* currently input thereto. The integrator 432 then adds an integrated value of the current value −ΔIqc to the current command value Iqcv*, and outputs such a calculation result as the current command value Iqc1*. The current command values Iqc1* decreases by a current value ΔIqc at every sampling time from the current command value Iqcv* existing when the trigger signal is input as an initial value. The current command value Iqc1* output by the integrator 432 is input to the switching period determiner 434, the current command value generator 435, and the third selector 437 as well.

The first selector 433 receives the current command value Iqcv*, a value 0, and a selecting signal sel as well. The first selector 433 selectively outputs one of the current command value Iqcv* and the value 0 as a current command value Iqc2* in accordance with the selecting signal sel.

The first selector 433 outputs the current command value Iqcv* as the current command value Iqc2* when the closed-loop control is specified by the selecting signal sel. By contrast, the first selector 433 outputs the value 0 as the current command value Iqc2* when the open-loop control is specified by the selecting signal sel. The current command value Iqc2* output by the first selector 433 is input to the third selector 437.

The switching period determiner 434 receives the selecting signal sel and the current command value Iqc1*. The switching period determiner 434 determines whether it is in a switching period for switching the current command values Idc* and Iqc* based on the selecting signal sel and the current command value Iqc1*. The switching period determiner 434 determines that it is in the switching period when the open-loop control is specified by the selecting signal sel and the current command value Iqc1* is 0 or more. The switching period determiner 434 otherwise determines that it is not in the switching period.

The switching period determiner 434 then outputs a switching signal in accordance with such a determination result. Herein below, it is premised that the switching period determiner 434 outputs a switching signal H when the switching period determiner 434 determines that it is in the switching period, and outputs a switching signal L when the switching period determiner 434 determines that it is not in the switching period. The switch signal output by the switching period determiner 434 is input to each of the third selector 437 and the fourth selector 438 as well.

The current command value generator 435 receives the current command value OpenIdc*. The current command value generator 435 generates and outputs the current command value Idc1* based on the OpenIdc* and the current command value Iqc1*. The current command value Idc1* is generated to meet the following formula.

$$Idc1^* = \sqrt{OpenIdc^{*2} - Iqc1^{*2}} \quad \text{(Formula 9)}$$

As can be seen from the formula 9, the current command value generator 435 generates the current command value Idc1* with an amplitude of a current supplied to the motor 1 before and after the control method is switched unchanged. To be able to generate such a current command value Idc1*, the current command values OpenIdc* is desirably set greater than the maximum value of the current command value Iqc1*, i.e. the maximum value of the current command values Iqcv*. The current command value Idc1* output by the current command value generator 435 is input to the fourth selector 438.

The second selector 436 receives the current command value OpenIdc*, the value 0, and the selecting signal sel as well. The second selector 436 selectively outputs one of the current command value OpenIdc* and the value 0 as the current command value Idc2* in accordance with the selecting signal sel.

That is, the second selector 436 outputs the value 0 as the current command value Idc2* when the closed-loop control is specified by the selecting signal sel. By contrast, the second selector 436 outputs the current command value OpenIdc* as the current command value Idc2* when the open-loop control is specified by the selecting signal sel. The current command value Idc2* output by the second selector 436 is input to the fourth selector 438.

The third selector 437 receives the current command values Iqc1* and Iqc2* and the switching signal as well. The third selector 437 selectively outputs one of the current command value Iqc1* and the current command value Iqc2* as the current command value Iqc* in accordance with the switch signal.

That is, the third selector 437 outputs the current command values Iqc1* as the current command value Iqc* when the switching signal H is input thereto (i.e., during the switching period). By contrast, the third selector 437 outputs the current command values Iqc2* as the current command value Iqc* when the switching signal L is input thereto (i.e., out of the switching period).

The fourth selector 438 receives the current command values Idc1*, Idc2* and the switching signal (H or L). The fourth selector 438 selectively outputs one of the current command value Idc1* and the current command value Idc2* as the current command value Idc* in accordance with the switch signal (H or L).

That is, the fourth selector 438 outputs the current command value Idc1* as the current command value Idc* when the switching signal H is input thereto (i.e., during the switching period). By contrast, the fourth selector 438 outputs the current command value Idc2* as the current command value Idc* when the switching signal L is input thereto (i.e., out of the switching period).

Hence, with the above-described configuration, the command value switching unit 43 outputs the current command values Iqcv* as the current command value Iqc* and the value 0 as the current command value Idc* when the closed-loop control is specified by the selecting signal sel. Further, during the switching period, the command value switching unit 43 outputs the current command value Iqc1* as the current command value Iqc* and the current command value Idc1* as the current command value Idc* as well. Further, the command value switching unit 43 outputs the value 0 as the current command value Iqc* and the current command value OpenIdc* as the current command value Idc* as well when the open-loop control is specified by the selecting signal sel and the switching period is over.

As described above, the current command value Idc1* is generated to render the amplitude of the current supplied to the motor 1 is equivalent to the current command value OpenIdc*. Accordingly, the amplitude of the current supplied to the motor 1 during the switching period becomes the current command value OpenIdc*. As a result, the command value switching unit 43 can output the current command values Idc* and Iqc* with the amplitude of the current supplied to motor 1 during the switching period equivalent to the amplitude of the current supplied to the motor 1 when the switching period is over.

The command value switching unit 43 is not limited to the configuration illustrated in FIG. 7 and can be optionally configured as long as it can transition the current command values Idc* and Iqc* in the above described manner. Although, in the example of FIG. 7, the command value switching unit 43 linearly decreases the current command value Iqc1*, a method of decreasing the current command values Iqc1* is not limited to this. For example, the command value switching unit 43 can linearly increase the current command value Idc1* from the value 0 to the value OpenIdc*, and decreases the current command value Iqc1* in accordance with a change in current command value Idc1*.

Herein below, exemplary operation of a motor driving system is described with reference to FIG. 8 and applicable drawings.

Figure 8:
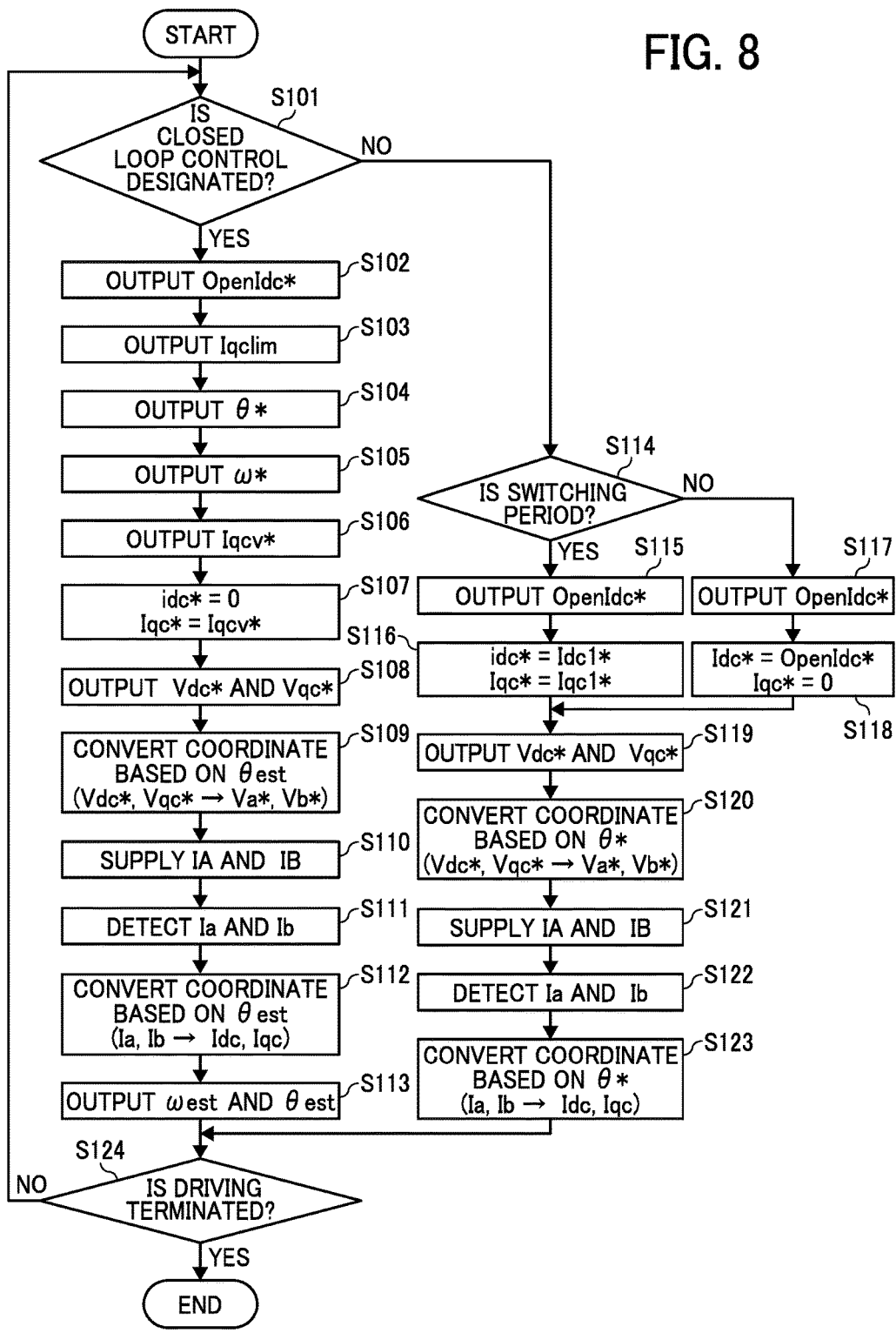
FIG. 8 is a flowchart illustrating one example of an operational sequence of the motor driving system according to the first embodiment of the present disclosure.

FIG. 8 is a flowchart illustrating one example of sequential operation of the motor driving system according to this embodiment of the present disclosure. When the closed-loop control is designated by the selecting signal sel input to the motor controller 4 through the pin P8 (YES, in step S101), the motor controller 4 controls the motor 1 by conducting the closed-loop control. The closed-loop control corresponds to steps S102 to S113 illustrated in FIG. 8. By contrast, the motor controller 4 conducts the open-loop control to control the motor 1 when the open-loop control is designated by the selecting signal sel (NO, in step S101). The open-loop control corresponds to steps S114 to S123 illustrated in FIG.

8. Herein below, the open-loop control and the closed-loop control are described more in detail.

First of all, the closed-loop control is described. When the closed-loop control is designated by the selecting signal sel, the A/D converter 72 applies AD conversion to the reference signal Vref input to the motor controller 4 through the pin P5, and outputs the current command value OpenIdc* (in step S102). The current command values OpenIdc* is then input to the current limit generator 73.

The current limit generator 73 generates the current limit value Iqclim base on the current command value OpenIdc* and outputs such a generation result (in step S103). The current limit value Iqclim is input to the speed controller 42.

Subsequently, the angle command value generator 71 generates and outputs the angle command value θ* based on the clock signal clk input to the motor controller 4 through the pin P6 and the direction indicating signal dir input to the motor controller 4 through the pin P7 (in step S104). Here, the step S104 can be executed either after or at the same time as the steps S102 and S103 are executed. In anyway, The angle command value θ* is then input to the position controller 41.

The position controller 41 calculates the angle error θerr based on the angle command value θ* and the angle estimated value θest, and outputs a speed command value ω* to render the angle error θerr to follow 0 (zero) (in step S105). The speed command value ω* is then input to the speed controller 42.

The speed controller 42 calculates the speed error ωerr based on the speed command value ω* and the speed estimated value ωest, and further calculates and outputs the current command value Iqcv* based on the speed error ωerr and the current limit value Iqclim (in step S106). The current command value Iqcv* is input to the command value switching unit 43.

The command value switching unit 43 outputs the current command value Iqcv* as the current command value Iqc*, and the value 0 as the current command value Idc* (in step S107). The current command values Idc* and Iqc* output by the command value switching unit 43 are input to the current controller 44.

The current controller 44 calculates current errors Idcerr and Iqcerr based on the current command values Idc* and Iqc* and the current values Idc and Iqc, respectively, and outputs the voltage command values Vdc* and Vqc* to render the current errors Idcerr and Iqcerr to follow 0 (zero) (in step S108). The voltage command values Vdc* and Vqc* output by the current controller 44 are input to the first coordinate converter 45. In addition, the voltage command value Vdc* output by the current controller 44 is input to the estimating unit 47.

The first coordinate converter 45 applies coordinate conversion to the voltage values Vdc* and Vqc* based on the angle estimated value θest input from the selector 48, and outputs the voltage command values Va* and Vb* through the pins P1 and P2, respectively (in step S109). The voltage command values Va* and Vb* output by the first coordinate converter 45 are input to the inverter 2.

The inverter 2 supplies the currents IA and IB in accordance with the voltage command values Va* and Vb* to the respective coils of A and B phases of the motor 1 (in step S110). With this, the motor 1 is driven with the actual angle θre of the rotor following the angle command value θ*.

The current detector 3 detects the current values Ia and Ib of the respective currents IA and IB supplied to the motor 1, and outputs such detection results (in step S111). These current values Ia and Ib output by the current detector 3 are input to the second coordinate converter 46 via pins P3 and P4, respectively.

The second coordinate converter 46 applies coordinate conversion to the current values Ia and Ib based on the angle estimated value θest input from the selector 48 and output the current values Idc and Iqc (in step S112). These current values Idc and Iqc output by the second coordinate converter 46 are input to each of the current controller 44 and the estimating unit 47 as well.

The estimating unit 47 calculates the speed estimated value ωest and the angle estimated value θest based on the voltage command value Vdc* and the current values Idc and Iqc, and outputs such a calculation result (in step S113). Respective methods of calculating the speed estimated value ωest and the angle estimated value θest are already described earlier. The speed estimated value ωest output by the estimating unit 47 is input to the speed controller 42. The angle estimated value θest output by the estimating unit 47 is input to each of the position controller 41 and the selector 48 as well.

Hereafter, when the closed-loop control is designated, the motor driving system repeats processes of steps S102 to S113 until the motor 1 stops driving (NO, in step S124).

Although, in the example of FIG. 8, the current command value OpenIdc* and the current limit value Iqclim are calculated per processing time, these values can be calculated only once at a time of starting the closed-loop control. That is, in such a situation, the speed controller 42 is only needed to memorize the current limit value Iqclim input for the first time and undertake the subsequent processing steps. With this, a calculation amount needed in each of the processing times can be reduced.

Now, the open-loop control is described in detail. When the open-loop control is designated by the selecting signal sel, the command value switching unit 43 determines whether or not it is in the switching period (in step S114). This determination is made by the switching period determiner 434 of FIG. 7.

When it is in the switching period (Yes, in step S114), the A/D converter 72 applies A/D conversion to the reference signal Vref input to the motor controller 4 through the pin P5 and outputs the current command value OpenIdc* (in step S115). The current command value OpenIdc* is then input to the command value switching unit 43. The command value switching unit 43 then outputs the value Iqc1* as the current command value Iqc* and the current command value Idc1* as the current command value Idc* (in step S116).

By contrast, when it is out of the switching period (i.e., NO, in step S114), the A/D converter 72 also applies the A/D conversion to the reference signal Vref input to the motor controller 4 through the pin P5 and outputs the current command value OpenIdc* (in step S117). The current command value OpenIdc* is then input to the command value switching unit 43. The command value switching unit 43 then outputs the value 0 (zero) as the current command value Iqc* and the current command value OpenIdc* as the current command value Idc* as well (in step S118). These current command values Idc* and Iqc* output by the command value switching unit 43 are input to the current controller 44.

The current controller 44 calculates the current errors Idcerr and Iqcerr based on the current command values Idc* and Iqc* and the current values Idc and Iqc, respectively, and then outputs the voltage command values Vdc* and Vqc* to render each of these current errors Idcerr and Iqcerr to follow 0 (zero) (in step S119). The voltage command values Vdc* and Vqc* output by the current controller 44 are input to the first coordinate converter 45.

The first coordinate converter 45 applies coordinate conversion to the voltage command values Vdc* and Vqc* based on the angle command value θ* input from the selector 48, and outputs voltage command values Va* and Vb* through the pins P1 and P2, respectively (in S120 step). These voltage command values Va* and Vb* output by the first coordinate converter 45 are input to the inverter 2.

The inverter 2 supplies the currents IA and IB in accordance with the voltage command values Va* and Vb* to the coils of the A and B phases of the motor 1, respectively (in step S121). With this, the motor 1 is driven.

The current detector 3 detects and outputs the current values Ia and Ib of the currents IA and IB supplied to the motor 1 (in step S122). These current values Ia and Ib output by the current detector 3 are input to the second coordinate converter 46 through the pins P3 and P4, respectively.

The second coordinate converter 46 applies coordinate conversion to the current values Ia and Ib based on the angle command value θ* input from the selector 48, and outputs the current values Idc and Iqc, respectively (in step S123). These current values Idc and Iqc output by the second coordinate converter 46 are input to the current controller 44.

Hereafter, when the open-loop control is designated, the motor driving system repeats processes of steps S114 to S123 until the motor 1 stops driving (NO, in step S124).

When the open-loop control is running, at least one of the position controller 41, the speed controller 42, and the estimating unit 47 of the motor controller 4 may be either operate or not operated. That is, by stopping the at least one of the position controller 41, the speed controller 42, and the estimating unit 47, the power consumption of the motor controller 4 can be reduced. The position controller 41, the speed controller 42, and the estimating unit 47 are stopped and started (i.e., controlled), for example, by the command value switching unit 43 in accordance with the selecting signal sel.

Although, in the example of FIG. 8, it is calculated per processing time, the current command value OpenIdc* can be calculated only once at a time of starting the open-loop control. In such a situation, the command value switching unit 43 is only needed to memorize the current command value OpenIdc* firstly input thereto and undertake the subsequent processing steps. With this, a calculation amount needed in each of the processing times can be reduced.

Figure 9:
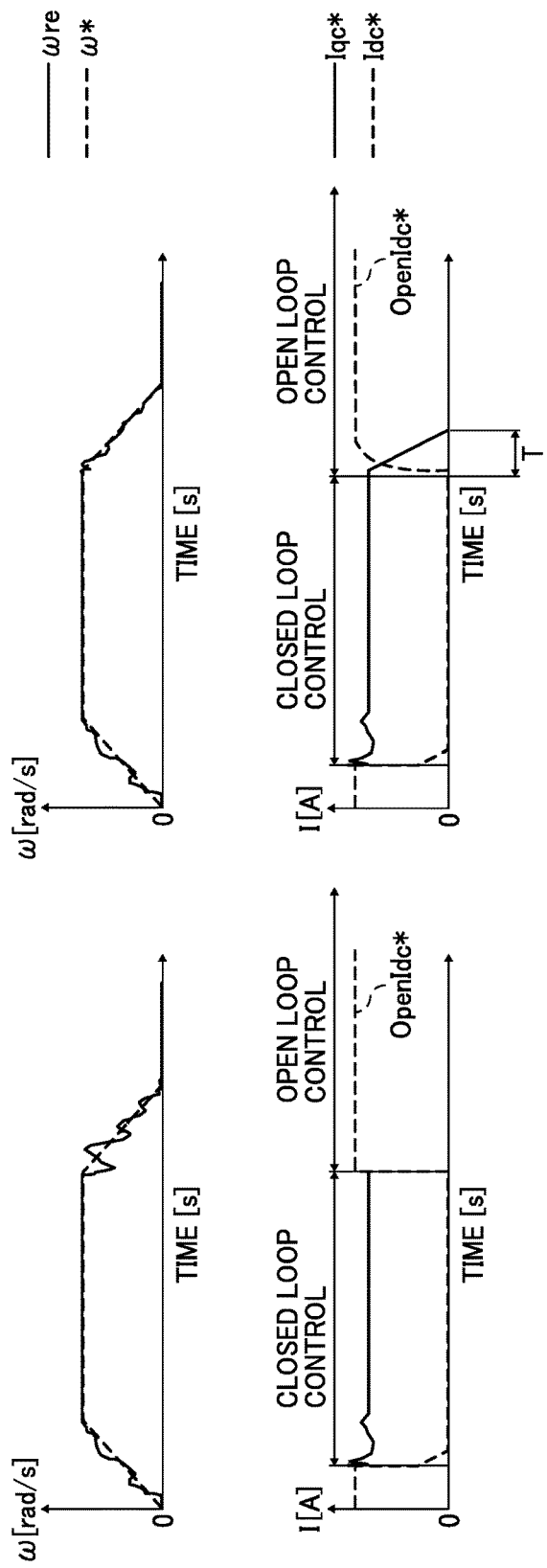
FIG. 9 is a diagram illustrating an exemplary simulation result of motor control according to the first embodiment of the present disclosure.

FIG. 9 illustrates an exemplary simulation result of motor control conducted by the motor driving system according to the first embodiment of the present disclosure. In FIG. 9, each of upper side graphs illustrates the speed command value ω* and the actual speed ωre. Each of lower side graphs illustrates the current command values Idc* and Iqc* as well. Also, in FIG. 9, left side graphs illustrate simulation results in a situation in which the switching period T is absent. By contrast, right side graphs illustrate simulation results in a case where the switching period T is present.

As shown in FIG. 9, the motor 1 is controlled to stop driving, accelerate, drive at a constant speed, deaccelerate, and stop driving again in this order. In each of the processes, the motor 1 receives a load equivalent to a pullout torque. As also illustrated there, when deceleration starts, the control method is switched from the closed-loop control to the open-loop control.

As illustrated in the lower left graph of FIG. 9, when the switching period T is absent and the control method is switched, the current command value Idc* is momentarily switched from the value 0 (zero) to the value OpenIdc*, while the current command value Iqc* is switched from a current value existing at that time to the value 0 (zero). However, when the current command values Idc* and Iqc* are momentarily switched in this way, the electric angle of the current supplied to the motor 1 becomes discontinuous, thereby causing a significant torque oscillation in the motor 1.

As a result, as illustrated in a graph on the upper left of FIG. 9, the actual speed ωre of the motor 1 does not sufficiently follow the speed command values ω*, and accordingly, oscillates regarding the speed command values ω*. Oscillation of the actual speed ωre may cause noises and stepping out of the motor 1.

By contrast, as illustrated in a graph on the lower right side of FIG. 9, the motor driving system according to this embodiment of the present disclosure, when the control method is switched, the current command value Idc* transitions from the value 0 (zero) to the value OpenIdc* step by step and the current command value Iqc* transitions from the value existing at the time to the value 0 step by step during the switching period T. Thus, when the current command values Idc* and Iqc* transition step by step in this way, discontinuation of the electric angle of the current supplied to the motor 1 can substantially be avoided, thereby reducing oscillation of torque in the motor 1. As a result, as illustrated in a graph on the right upper side of FIG. 9, the actual speed ore of the motor 1 can follow the speed command value ω*.

As described heretofore, according to this embodiment of the present disclosure, both of the current command value OpenIdc* and the current limit value Iqclim can be generated based on the reference signal Vref input to the motor controller 4 through the pin P5. That is, the pin P5 can be shared as an input pin to set both of the current command value OpenIdc* and the current limit value Iqclim. Accordingly, according to this embodiment of the present disclosure, the number of input pins used to set the current command values OpenIdc* and the current limit value Iqclim can be decreased to be less than two as required in a conventional motor control IC. As a result, the motor control IC can be downsized while reducing its cost.

Further, according to this embodiment of the present disclosure, since the current command value Iqcv* is set to the current limit Iqclim or less, damaging the motor driving system due to excessive current can be prevented.

Further, according to the motor driving system of this embodiment of the present disclosure, oscillation of torque of the motor 1 occurring in association with switching between the current command values Idc* and Iqc* when the control method of controlling the motor 1 is switched can be suppressed. Hence, noises and stepping out of the motor 1 can be effectively suppressed again.

Figure 10:
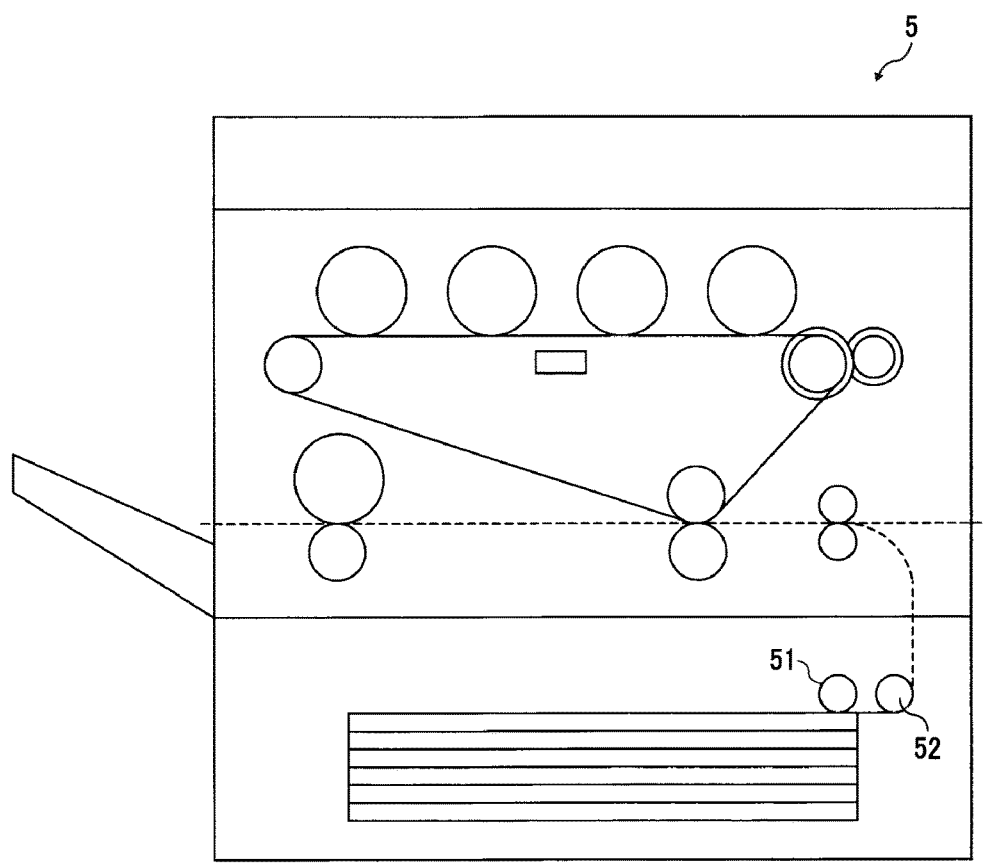
FIG. 10 is a diagram schematically illustrating one example of an image forming apparatus according to the first embodiment of the present disclosure.

FIG. 10 illustrates one example of an image forming apparatus 5. The image forming apparatus 5 of FIG. 10 includes a printing function (a printer). The image forming apparatus 5 may include functions of a scanner and a facsimile or the like. The image forming apparatus 5 also includes multiple rollers, such as a sheet feeding roller 51, a sheet conveying roller 52, etc. That is, the motor driving system according to the first embodiment of the present disclosure may be used in the image forming apparatus 5 to drive these rollers.

Figure 11:
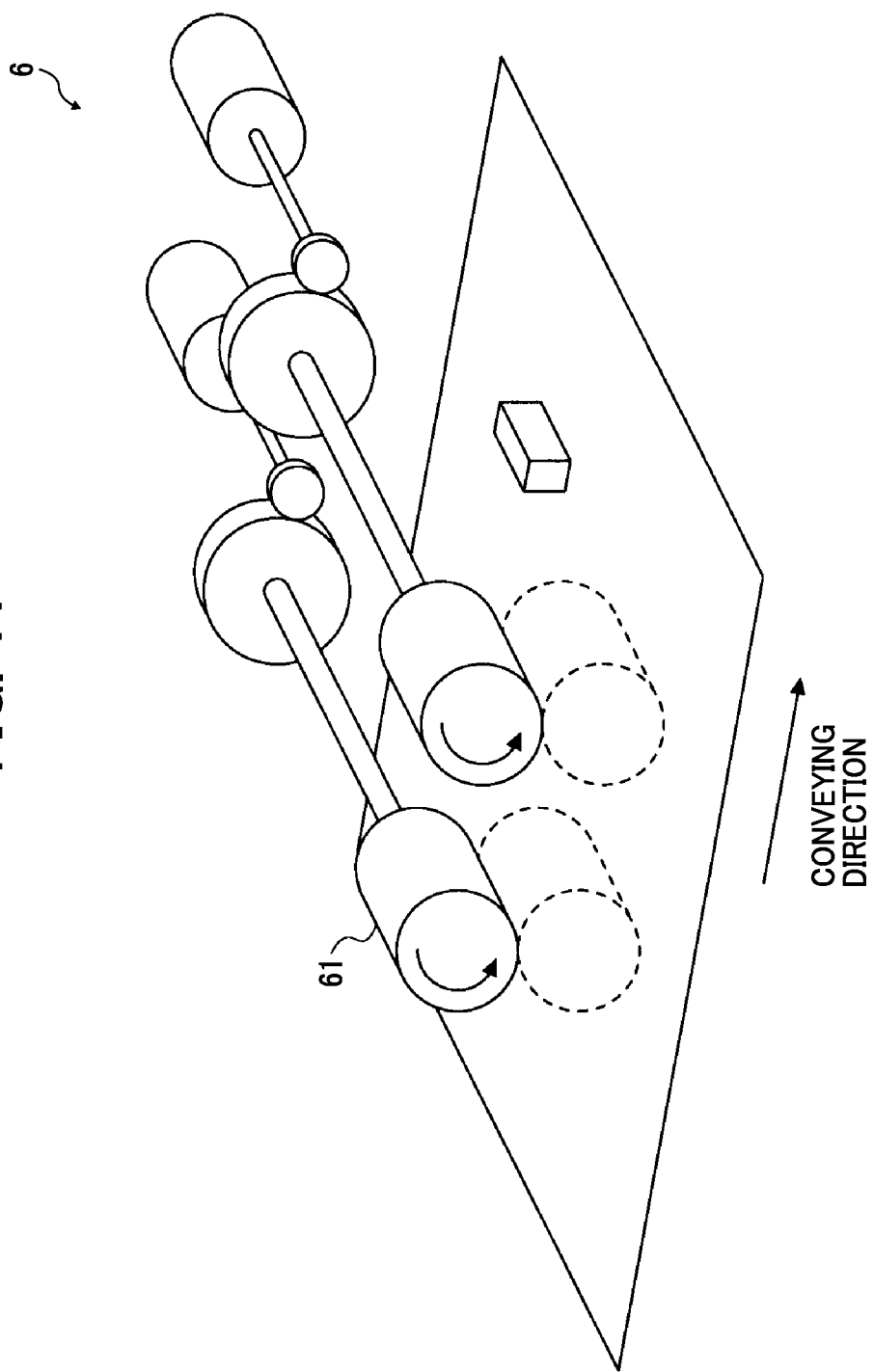
FIG. 11 is a diagram illustrating one example of a conveying device according to the first embodiment of the present disclosure.

FIG. 11 illustrates one example of a sheet conveying device. The sheet conveying device 6 of FIG. 11 is an optional device to convey a sheet like object, such as a paper sheet, a sheet money, a prepreg sheet, etc. The sheet conveying device 6 can be installed in the image forming apparatus 5. The sheet conveying device 6 includes a pair of sheet conveying rollers 61 to convey the sheet-like object. The motor driving system according to this embodiment of the present disclosure may be used in either the sheet conveying device 6 or the image forming apparatus 5 to drive these rollers.

Further, the motor driving system according to this embodiment of the present disclosure is applicable not only to the image forming apparatus 5 and the sheet conveying device 6, but also to any device with a stepping motor, such as a car, a robot, an amusement apparatus, etc.

Figure 12:
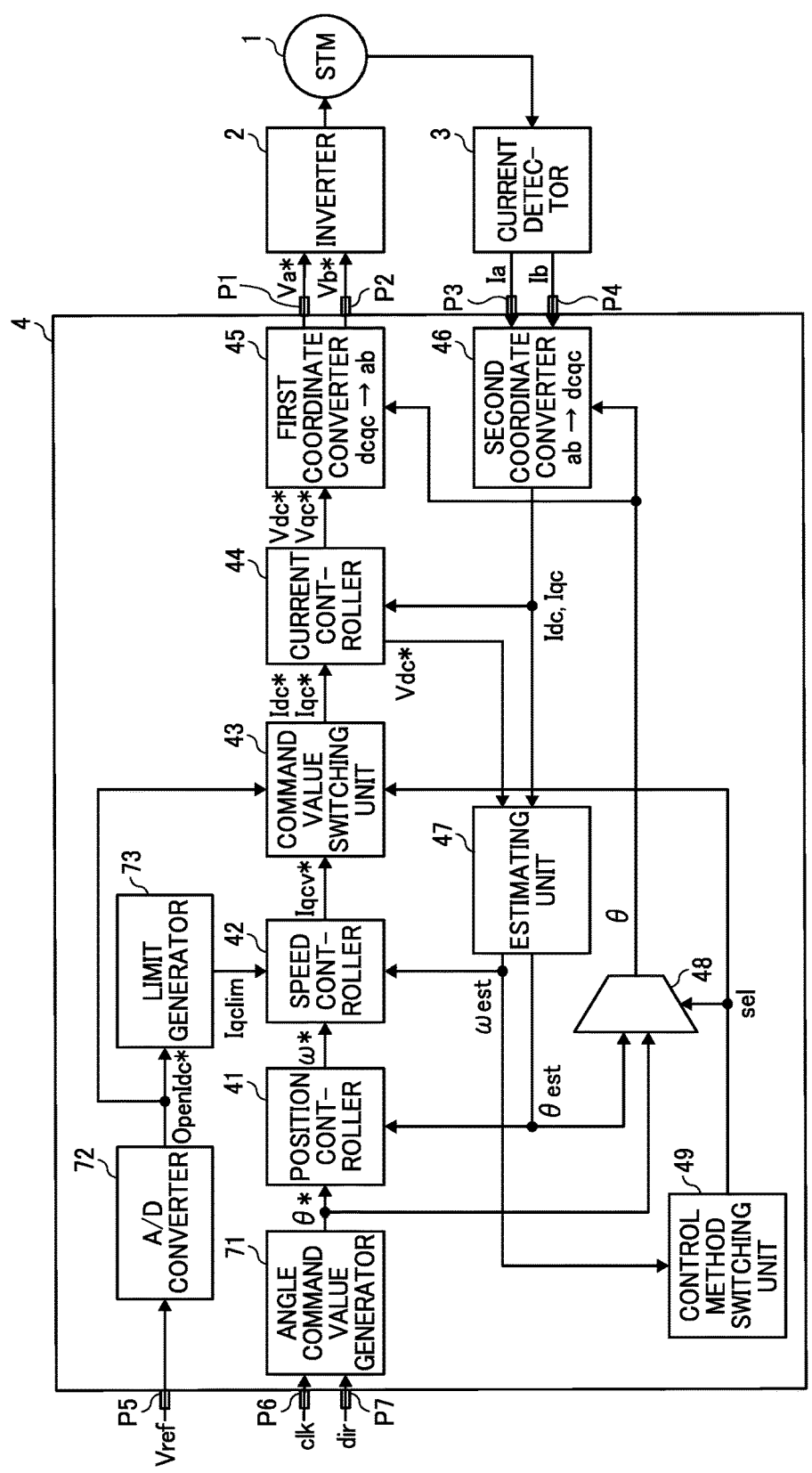
FIG. 12 is a diagram schematically illustrating one example of a motor driving system according to a second embodiment of the present disclosure.

Now, a motor driving system according to a second embodiment of the present disclosure is described with reference to FIGS. 12 and 13. FIG. 12 illustrates one example of a motor driving system according to this embodiment of the present disclosure. As illustrated there, the motor controller 4 of this embodiment of the present disclosure includes a control method switching unit 49 as a functional element. The control method switching unit 49 is realized by a processor when the processor runs program stored in a memory. Remaining configuration of this embodiment of the present disclosure is substantially the same as in the first embodiment of the present disclosure.

Hence, the control method switching unit 49 receives the speed estimated value ωest from the estimating unit 47. The control method switching unit 49 selects a control method based on the speed estimated value ωest and outputs the selecting signal sel that specifies a selected control method. In this way, in this embodiment of the present disclosure, since the selecting signal sel is generated inside the motor controller 4, the motor controller 4 excludes the pin P8 (of the first embodiment of the present disclosure). The selecting signal sel output by the control method switching unit 49 is input to the command value switching unit 43 and the selector 48 as in the first embodiment of the present disclosure.

For example, the control method switching unit 49 selects the closed-loop control when the speed estimated value ωest is a threshold or more. The control method switching unit 49 also selects the open-loop control when the speed estimated value ωest is below the threshold as well. With this, in accordance with a speed of the motor 1, the control method can be switched. Further, by performing the closed-loop control based on an induced voltage when the motor 1 is driven at high speed, the motor 1 can be high accurately controlled. Here, the threshold of the speed estimated value ωest used when the open-loop control is switched from the closed-loop control and the threshold of the speed estimated value ωest used when the closed-loop control is switched from the open-loop control may be either the same or different from each other.

Further, the control method switching unit 49 may select a control method based on a change in speed estimated value ωest (i.e., an estimated value of an acceleration speed). With this, the control method can be switched in accordance with a state of the motor 1, such as a decelerating state, an accelerating state, a constant speed driving state, etc. This selecting method can be combined with the above-described selecting method as well.

Figure 13:
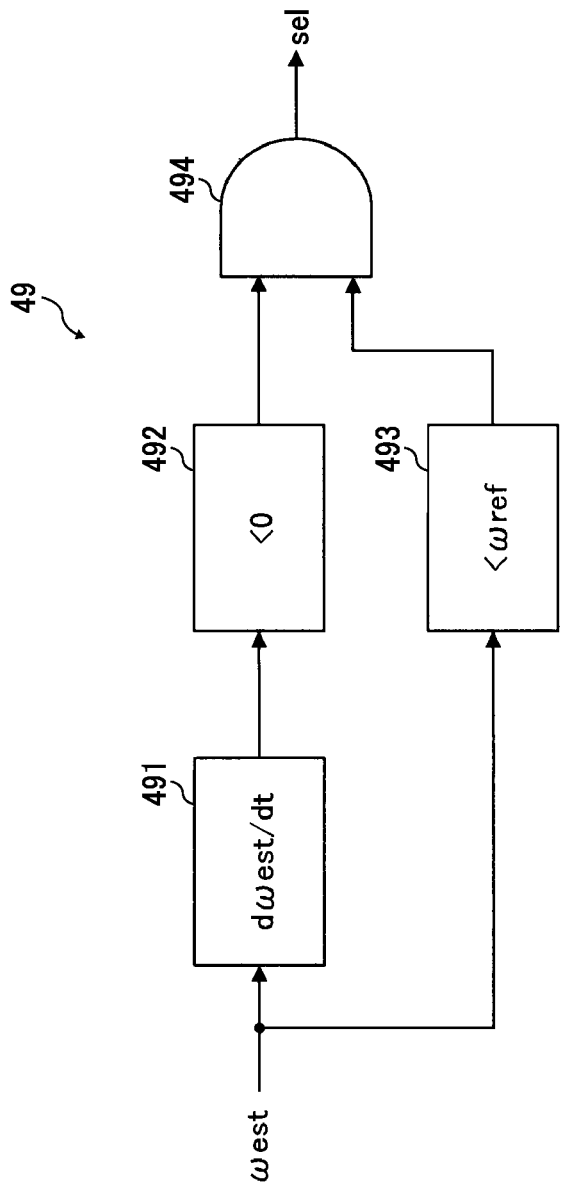
FIG. 13 is a diagram schematically illustrating one example of a control method switching unit according to the second embodiment of the present disclosure.

FIG. 13 illustrates one example of the control method switching unit 49. The control method switching unit 49 of FIG. 13 selects the control method based on the speed estimated value ωest and a change in speed estimated value ωest. Specifically, the control method switching unit 49 of FIG. 13 includes a differentiator 491 and a deceleration determiner 492, a speed determiner 493, and a control method selector 494 as well.

The differentiator 491 differentiates the speed estimated value ωest and outputs a differential value obtained in this way. This differential value is equivalent to the estimated value of the acceleration speed of the rotor. The differential value output by the differentiator 491 is input to the deceleration determiner 492.

The deceleration determiner 492 determines if the rotor is in the decelerating state based on the differential value and outputs a determination result. The deceleration determiner 492 determines that the rotor is in the decelerating state when the differential value is below the value 0 (zero). Such a determination result is output by the deceleration determiner 492 and is input to the control method selector 494.

The speed determiner 493 determines if the speed estimated value ωest is below a speed threshold ωref and outputs a determination result obtained in this way. The determination result output by the speed determiner 493 is input to the control method selector 494.

The control method selector 494 selects a control method in accordance with the determination results input from the deceleration determiner 492 and the speed determiner 493, respectively, and outputs a selecting signal sel that specifies the control method as selected. The control method selector 494 selects the open-loop control when the motor 1 is in the decelerating state and the speed estimated value ωest is below the threshold ωref. The control method selector 494 otherwise selects the closed-loop control.

As described heretofore, according to the motor driving system of this embodiment of the present disclosure, the control method can be automatically switched in accordance with the speed estimated value ωest of the motor 1. Further, the number of input pins to be used in the motor controller can be reduced at the same time.

Figure 14:
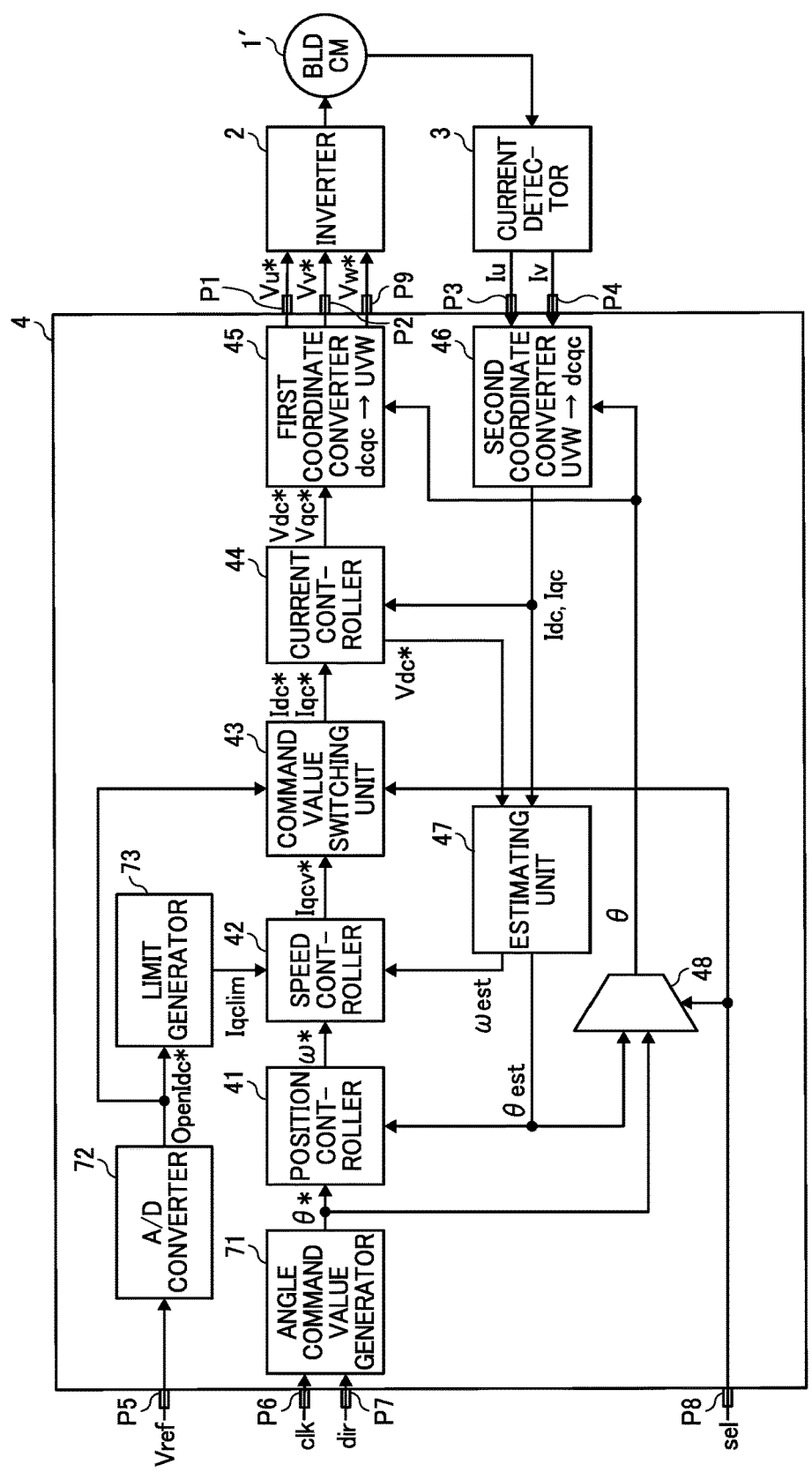
FIG. 14 is a diagram schematically illustrating an exemplary motor driving system according to a third embodiment of the present disclosure.

Now, a motor driving system according to a third embodiment of the present disclosure is described with reference to FIGS. 14 and 15. FIG. 14 illustrates one example of the motor driving system of the present embodiment of the present disclosure.

A motor 1' is a three-phase brushless DC motor (Brushless Direct Current Motor). Each of phases of the motor 1' is hereinafter referred to as a U-phase, a V-phase, and a W-phase. The motor 1' includes coils (i.e., a stator) of respective U-phase, V-phase, and W-phase and a rotor. The rotor is composed of a permanent magnet having S and N poles arranged alternately and includes p pairs of poles (i.e., p pairs of S pole and N pole).

The motor 1' is driven by an electric current supplied from the inverter 2. Specifically, currents IU, IV, and IW are supplied from the inverter 2 to the coils of the U-phase, V-phase, and W-phase of the motor 1', respectively. The rotor of the motor 1' rotates by following magnetic fields generated by the coils of the U-phase, V-phase, and W-phase in accordance with the currents IU, IV, and IW, respectively.

The inverter 2 drives the motor 1' by supplying the currents IU, IV, and IW in accordance with the voltage command values Vu*, Vv*, and Vw* output by the motor controller 4. Here, in this embodiment of the present disclosure, the inverter 2 can be configured by a PWM (Pulse Width Modulation) circuit that generates control signals of three-phases based on the voltage command values Vu*, Vv*, and Vw*, respectively, and a three-phase driving circuit.

Further, in this embodiment of the present disclosure, the motor controller 4 includes multiple pins P1, P2 and P9 as output pins. The voltage command values Vu*, Vv*, and Vw* are output from the respective pins P1, P2, and P9.

The current detector 3 detects and outputs at least two of the current values Iu, Iv, and Iw of the respective currents IU, IV, and IW supplied to the motor 1'. In an example of FIG. 14, the current detector 3 detects the current values Iu and Iv. The current values Iu and Iv output by the current detector 3 are input to the motor controller 4. The current detector 3 is similarly configured to that in the first embodiment of the present disclosure. Here, in this embodiment of the present disclosure, instead of the current value Ia, the current value Iu is input to the motor controller 4 through the pin P3. In addition, instead of the current value Ib, the current value Iv is input to the motor controller 4 through the pin P4 as well.

The first coordinate converter 45 generates voltage command values Vu*, Vv*, and Vw* by applying coordinate conversion to the voltage command values Vdc* and Vqc* from a dcqc coordinate system to a UVW coordinate system. The first coordinate converter 45 outputs the voltage command values Vu*, Vv*, and Vw* through the pin P1, P2 and P9, respectively. The voltage command values Vu*, Vv*, Vw* output by the first coordinate converter 45 are input to the inverter 2. These voltage command values Vu*, Vv*, and Vw* can be represented by the following formula.

$$\begin{vmatrix} Vu^* \\ Vv^* \\ Vw^* \end{vmatrix} = \begin{vmatrix} \cos\theta & -\sin\theta \\ \cos(\theta - 2\pi/3) & -\sin(\theta - 2\pi/3) \\ \cos(\theta + 2\pi/3) & -\sin(\theta + 2\pi/3) \end{vmatrix} \begin{vmatrix} Vdc^* \\ Vqc^* \end{vmatrix} \quad \text{(Formula 10)}$$

The first term of the right hand of the formula (10) is a conversion matrix for coordinate conversion. A reference character θ represents an angle input from the selector 48, and is an angle command value θ* when the open-loop control is conducted, and an angle estimated value θest when the closed-loop control is conducted.

The second coordinate converter 46 calculates a current value Iw based on the current values Iu and Iv input to the motor controller 4 through the pins P3 and P4, respectively. The second coordinate converter 46 then generates and outputs current values Idc and Iqc by converting a coordinate of the current values Iu, Iv, and Iw from the UVW coordinate system to the dcqc coordinate system. The current values Idc and Iqc output by the second coordinate converter 46 are input to each of the current controller 44 and the estimating unit 47 as well. These current values Idc and Iqc are represented by the following formula. The current values Idc and Iqc output by the second coordinate converter 46 are input to each of the current controller 44 and the estimating unit 47 as well. These current values Idc and Iqc are represented by the following formula.

$$\begin{vmatrix} Idc \\ Iqc \end{vmatrix} = \begin{vmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{vmatrix} \begin{vmatrix} Iu \\ Iv \\ Iw \end{vmatrix} \quad \text{(Formula 11)}$$

A first term of the right hand of the formula (11) is a conversion matrix for coordinate conversion. A reference character θ represents an angle input from the selector 48, and is an angle command value θ* when the open-loop control is conducted and an angle estimated value θest when the closed-loop control is conducted.

Remaining configurations of the motor driving system of this embodiment of the present disclosure is similar to those of the first embodiment of the present disclosure. Hence, with the above-described configurations, the motor driving device according to this embodiment of the present disclosure can drive the three-phase brushless DC motor as that employed in the first embodiment of the present disclosure. Specifically, torque oscillation, noises, and stepping out of the motor 1' generally caused when the method of controlling the motor 1' and accordingly each of the current command values Idc* and Iqc* is switched can be either suppressed or reduced.

Figure 15:
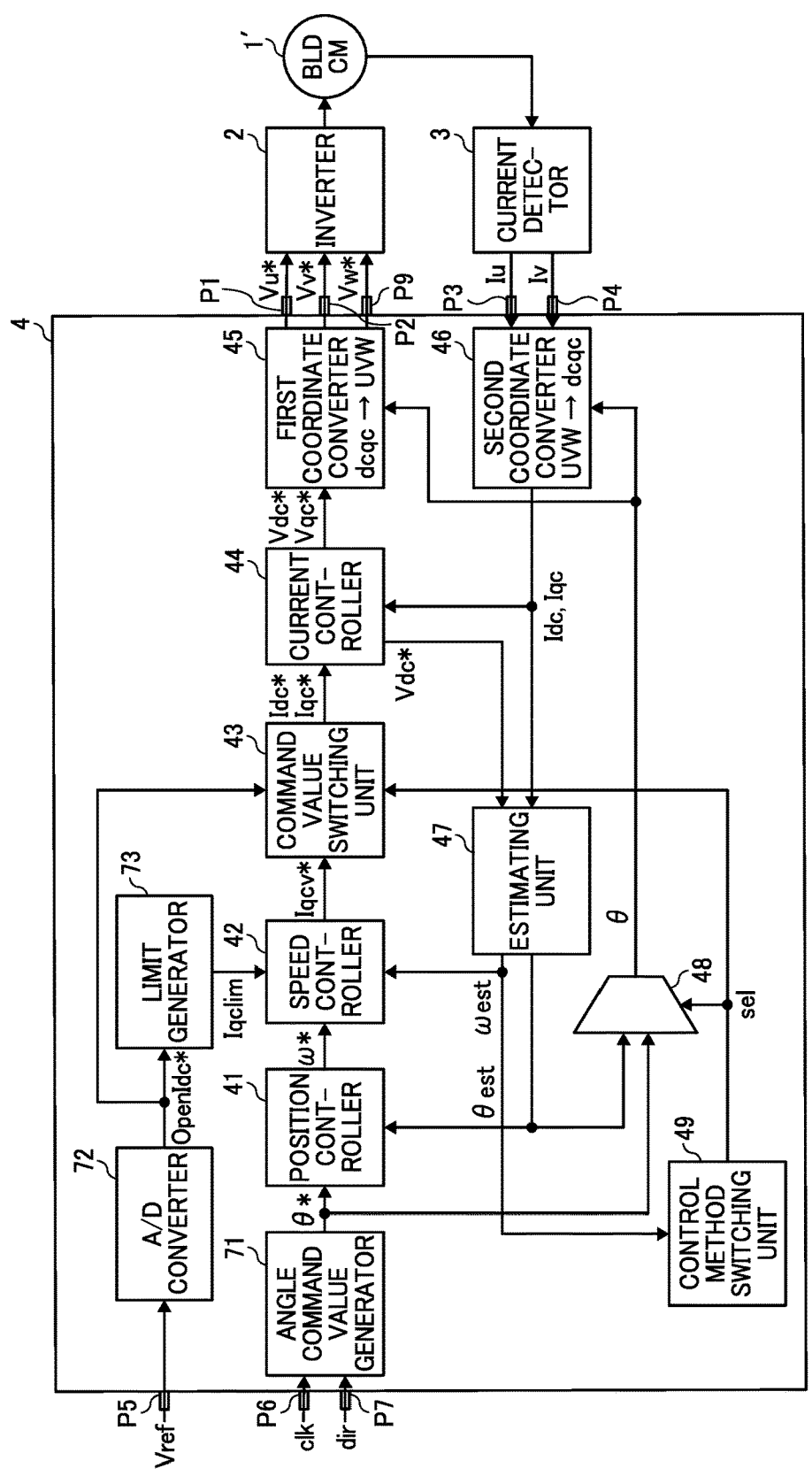
FIG. 15 is a diagram schematically illustrating a modification of the motor driving system of FIG. 14.

Further, as illustrated in FIG. 15, the control method switching unit 49 of the second embodiment of the present disclosure can be added to the motor driving system of the third embodiment of the present disclosure as well. With this, the control method of controlling the three-phase brushless DC motor can be automatically switched.

The motor driving system according to the third embodiment of the present disclosure is applicable to any device with a three-phase brushless DC motor, such as an image forming apparatus 5, a sheet conveying device 6, a car, a robot, an amusement apparatus, etc.

Hence, according to various embodiments of the present disclosure, the number of input pins used in the motor control IC can be reduced, thereby downsizing the motor control IC.

Numerous additional modifications and variations of the present disclosure are possible in light of the above teachings. It is therefore to be understood that within the scope of the appended claims, the present disclosure may be executed otherwise than as specifically described herein. For example, the motor controller is not limited to the above-described various embodiments and may be altered as appropriate. Similarly, the motor driving apparatus is not limited to the above-described various embodiments and may be altered as appropriate. Similarly, the motor driving apparatus is not limited to the above-described various embodiments and may be altered as appropriate. Similarly, the motor driving system is not limited to the above-described various embodiments and may be altered as appropriate. Similarly, the image forming apparatus is not limited to the above-described various embodiments and may be altered as appropriate.

Further, the method of controlling a motor is not limited to the above-described various embodiments and may be altered as appropriate. In particular, an order of various steps of the method of controlling a motor is not limited to the above-described various embodiments and may be altered as appropriate.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A motor controller configured to control a motor comprising:
   a first current command value generator configured to generate a first current command value;
   an analog-to-digital converter configured to generate a second current command value based on a reference signal externally input to the motor controller; and a current limit generator configured to generate an upper limit value of the first current command value based on the second current command value, wherein the motor controller is configured to control the motor in a first control method based on the first current command value and a second control method based on the second current command value, wherein the current limit generator is configured to generate the upper limit value by either multiplying the second current command value by a prescribed value or adding a prescribed value to the second current command value.

2. The motor controller according to claim 1, further comprising:

a command value switching unit configured to transition the second current command value to a first target value step by step and the first current command value to a second target value step by step during a switching period of time when a motor control method is switched from the first control method to the second control method.

3. The motor controller according to claim 2, wherein the command value switching unit is configured to transition the first current command value and the second current command value with an amplitude of a current supplied to the motor during the switching period equalized with an amplitude of the current supplied to the motor in accordance with the second current command value.

4. The motor controller according to claim 2, wherein the first control method is a closed-loop control method of controlling the motor based on the first current command value, with the first current command value calculated by feeding back at least one of an angle and a speed of the motor, and wherein the second control method is an open-loop control method of controlling the motor based on the first target value of the second current command value.

5. The motor controller according to claim 2, further comprising:

an estimating unit configured to estimate at least one of an angle and a speed of the motor based on a current supplied to the motor.

6. The motor controller according to claim 2, wherein the command value switching unit is configured to switche the motor control method during deceleration of the motor.

7. A motor driving apparatus comprising:

the motor controller according to claim 1; and an inverter configured to drive the motor in accordance with an output of the motor controller.

8. A motor driving system, comprising:

the motor; and the motor driving apparatus according to claim 7.

9. An image forming apparatus comprising:

a housing; and the motor driving system according to claim 8, wherein the motor driving system is installed in the housing.

10. A conveying device comprising:

a conveyor to convey an object; and the motor driving system according to claim 8, wherein the motor driving system is connected to the conveyor.

11. A method of controlling a motor with a motor controller by using a first control method and a second control method, comprising:

generating a first current command value;

receiving a reference signal externally input to the motor controller;

generating a second current command value with an analog-to-digital converter based on the reference signal;

generating an upper limit value of the first current command value with a current limit generator based on the second current command value; and alternately implementing the first control method and the second control method based on the upper limit value of the first current command value and the second current command value, respectively, wherein the generating of the upper limit value of the first current command value includes either multiplying the second current command value by a prescribed value or adding a prescribed value to the second current command value.

12. The method according to claim 11, further comprising:

transitioning the second current command value to a first target value step by step with a command value switching unit during a switching period of time when a motor control method is switched from the first control method to the second control method; and transitioning the first current command value to a second target value step by step during a period of time.

13. The method according to claim 12, further comprising transitioning the first current command value and the second current command value with the command value switching unit with an amplitude of a current supplied to the motor during the switching period equalized with an amplitude of the current supplied to the motor in accordance with the second current command value.

14. The method according to claim 12, further comprising implementing a closed-loop control method as the first control method by calculating the first current command value by feeding back at least one of an angle and a speed of the motor and controlling the motor based on the calculated first current command value, and implementing an open-loop control method as the second control method by controlling the motor based on the first target value of the second current command value.

15. The method according to claim 12, further comprising estimating at least one of an angle and a speed of the motor with an estimating unit based on a current supplied to the motor when the first control method is implemented.

16. The method according to claim 12, further comprising switching the motor control method with the command value switching unit during deceleration of the motor.

* * * * *